(12) United States Patent
Matsubara et al.

(10) Patent No.: US 11,505,057 B2
(45) Date of Patent: Nov. 22, 2022

(54) CONTROL APPARATUS FOR VEHICLE

(71) Applicants: TOYOTA JIDOSHA KABUSHIKI KAISHA, Toyota (JP); AISIN CORPORATION, Aichi-ken (JP)

(72) Inventors: Keigo Matsubara, Nagoya (JP); Masayuki Baba, Toyota (JP); Tomoya Inayoshi, Kariya (JP); Masakazu Kaifuku, Kariya (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 0 days.

(21) Appl. No.: 17/580,816

(22) Filed: Jan. 21, 2022

(65) Prior Publication Data
US 2022/0227218 A1    Jul. 21, 2022

(30) Foreign Application Priority Data
Jan. 21, 2021    (JP) .............................. JP2021-008336

(51) Int. Cl.
| | |
|---|---|
| *B60K 6/48* | (2007.10) |
| *B60K 6/547* | (2007.10) |
| *B60K 6/387* | (2007.10) |
| *B60W 20/40* | (2016.01) |
| *B60W 20/30* | (2016.01) |
| *F16H 61/00* | (2006.01) |

(52) U.S. Cl.
CPC .............. *B60K 6/547* (2013.01); *B60K 6/387* (2013.01); *B60K 6/48* (2013.01); *B60W 20/30* (2013.01); *B60W 20/40* (2013.01); *F16H 61/0009* (2013.01); *B60K 2006/4825* (2013.01); *F16H 2061/0087* (2013.01)

(58) Field of Classification Search
CPC .......... B60K 6/547; B60K 6/387; B60K 6/48; B60K 2006/4825; B60W 20/30; B60W 20/40; F16H 61/0009; F16H 2061/0087
See application file for complete search history.

(56) References Cited

U.S. PATENT DOCUMENTS

| | | | |
|---|---|---|---|
| 2010/0250037 A1* | 9/2010 | Yoshida ................. | B60W 10/06 903/946 |
| 2022/0111719 A1* | 4/2022 | Matsubara ............... | B60K 6/48 |

FOREIGN PATENT DOCUMENTS

JP    2018-079876 A    5/2018

* cited by examiner

*Primary Examiner* — David J Hlavka
(74) *Attorney, Agent, or Firm* — Oliff PLC

(57) ABSTRACT

A vehicle control apparatus includes (a) a clutch control portion configured to output a hydraulic-pressure command value for supplying a hydraulic pressure to a clutch actuator of a clutch disposed between an engine and an electric motor, when the engine is to be started by being cranked by the electric motor, and (b) a learning control portion configured to execute a plurality of leanings for correcting a relationship representing a correlation between the hydraulic pressure and the hydraulic-pressure command value, wherein at least one of the leanings is a higher priority learning, and at least one of the leanings is a lower priority learning. The learning control portion is configured, when the higher priority learning is in an unconverged state, to cause a degree of reflection of a learning result of the lower priority learning to be lower, than when the higher priority learning is in a converged state.

6 Claims, 9 Drawing Sheets

FIG.3

K0 CONTROL PHASE DEFINITIONS

| PHASE | STATE DEFINITION |
|---|---|
| K0 STANDBY | WAITING WITHOUT INITIATING K0 CLUTCH CONTROL OPERATION IN ENGINE START |
| QUICK APPLY | IMPROVING INITIAL RESPONSIVENESS OF HYDRAULIC PRESSURE, BY TEMPORARILY APPLYING HIGH HYDRAULIC PRESSURE, SO AS TO QUICKLY COMPLETE PACKING OF K0 CLUTCH |
| PACKING-STAGE CONSTANT-PRESSURE STANDBY | STANDING BY WITH CONSTANT PRESSURE, SO AS TO COMPLETE PACKING OF K0 CLUTCH |
| K0 CRANKING | EXECUTING ENGINE CRANKING BY K0 CLUTCH |
| QUICK DRAIN | IMPROVING INITIAL RESPONSIVENESS OF HYDRAULIC PRESSURE, BY TEMPORARILY OUTPUTTING LOW HYDRAULIC PRESSURE, SO AS TO QUICKLY STANDBY WITH PACKING-END PRESSURE |
| PRE-REENGAGING CONSTANT-PRESSURE STANDBY | STANDING BY WITH CERTAIN VALUE OF K0 TORQUE, SO AS TO AVOID DISTURBANCE TO COMPLETE EXPLOSION OF ENGINE |
| ROTATIONAL-SYNCHRONIZATION INITIAL-STAGE | CONTROLLING K0 TORQUE FOR ASSISTING INCREASE OF ENGINE ROTATIONAL SPEED, SO AS TO QUICKLY SYNCHRONIZE ENGINE ROTATIONAL SPEED AND MG ROTATIONAL SPEED TO EACH OTHER |
| ROTATIONAL-SYNCHRONIZATION INTERMEDIATE-STAGE | CONTROLLING K0 TORQUE SUCH THAT ENGINE RACING BECOMES APPROPRIATE VALUE |
| ROTATIONAL-SYNCHRONIZATION FINAL-STAGE | CONTROLLING K0 TORQUE SUCH THAT ENGINE ROTATIONAL SPEED AND MG ROTATIONAL SPEED ARE SYNCHRONIZED |
| ENGAGEMENT TRANSITION SWEEP | ENGAGING K0 CLUTCH |
| FULL-ENGAGEMENT TRANSITION SWEEP | FULLY ENGAGING K0 CLUTCH (INCREASING TO SAFETY FACTOR GUARANTEEING ENGAGEMENT OF K0 CLUTCH) |
| FULL ENGAGEMENT | MAINTAINING FULLY ENGAGED STATE OF K0 CLUTCH |
| BACKUP SWEEP | ENGAGING K0 CLUTCH (BACKUP CONTROL OPERATION) |
| CALCULATION STOP | STOPPING CALCULATIONS OF TORQUE AND HYDRAULIC PRESSURE DURING EXECUTION OF FAIL-SAFE CONTROL OPERATION |

CONTROL APPARATUS FOR VEHICLE

This application claims priority from Japanese Patent Application No. 2021-008336 filed on Jan. 21, 2021, the disclosure of which is herein incorporated by reference in its entirety.

FIELD OF THE INVENTION

The present invention relates to a control apparatus for a vehicle that includes an engine, an electric motor and a clutch capable of cutting off connection between the engine and the electric motor.

BACKGROUND OF THE INVENTION

There is well-known a control apparatus for a vehicle that includes an engine, drive wheels, an electric motor connected to a power transmission path between the engine and the drive wheels, in a power transmittable manner, a clutch disposed in the power transmission path between the engine and the electric motor, a hydraulic clutch actuator that is to be controlled to switch an operation state of the clutch, and a hydraulic control unit configured to supply a regulated hydraulic pressure to the clutch actuator. A vehicle control apparatus disclosed in JP 2018-79876A is an example of such a control apparatus. This Japanese Patent Application Publication teaches a control arrangement in which, when the engine is to be started, a rotational speed of the engine is increased with the clutch being slipped and engaged, and the electric motor is caused to output a compensation torque such that a deceleration torque generated by the engagement of the clutch is cancelled, wherein a timing learning is executed to correct a time difference between generation of a transmission torque of the clutch and generation of the compensation torque of the clutch, a magnitude learning is then executed, after the time difference is converged, to correct a magnitude difference between the transmission torque and the compensation torque, and a fast-filling-time learning is then executed, after the magnitude difference is converged, to correct a time for which a fast filling is executed to facilitate packing of the clutch by temporarily increasing a hydraulic-pressure command value upon initiation of the engagement of the clutch.

SUMMARY OF THE INVENTION

By the way, in the control arrangement disclosed in the above-identified Japanese Patent Application Publication, the timing learning, magnitude learning and fast-filling-time learning are sequentially executed. In the disclosed arrangement, however, if a convergence of an earlier executed one of the leanings is delayed, a convergence of a later executed one of the leanings is also delayed, so that a considerably long time could be required to correct variation of the hydraulic pressure.

The present invention was made in view of the background art described above. It is therefore an object of the present invention to provide a vehicle control apparatus capable of quickly progressing leanings related to engagement of a clutch when an engine is started.

The object indicated above is achieved according to the following aspects of the present invention.

According to a first aspect of the invention, there is provided a control apparatus for a vehicle that includes: an engine; drive wheels; an electric motor connected to a power transmission path between the engine and the drive wheels, in a power transmittable manner; a clutch which is disposed in the power transmission path between the engine and the electric motor and which includes a hydraulic clutch actuator that is to be controlled to switch an operation state of the clutch; and a hydraulic control unit configured to supply a regulated hydraulic pressure to the clutch actuator, the control apparatus comprising: an engine-start control portion configured, when the engine is to be started, to control the electric motor such that an output torque of the electric motor is increased by a magnitude corresponding to a required cranking torque that is a torque required for cranking of the engine, and to control the engine to start the engine; a clutch control portion configured, when the engine is to be started, to output, as a hydraulic-pressure command value for supplying the hydraulic pressure to the clutch actuator, a cranking hydraulic-pressure command value for regulating the hydraulic pressure supplied to the clutch actuator so as to cause the required cranking torque to be transmitted through the clutch, such that the outputted cranking hydraulic-pressure command value is supplied to the hydraulic control unit in an engaging process for switching of the operation state of the clutch from a released state to an engaged state; and a learning control portion configured to execute a plurality of kinds of leanings for correcting a relationship representing a correlation between the hydraulic pressure and the hydraulic-pressure command value in the engaging process, wherein the learning control portion is configured to set priorities for the plurality of kinds of leanings, such that at least one of the plurality of kinds of leanings is a higher priority learning to which a higher priority is given, and such that at least one of the plurality of kinds of leanings is a lower priority learning to which a lower priority is given than to the higher priority learning, and wherein the learning control portion is configured, when it is determined that the higher priority learning is in an unconverged state, to cause a degree of reflection of a learning result of the lower priority learning to be lower, than when it is determined that the higher priority learning is in a converged state. It is noted that the above-described feature that "the learning control portion is configured, when it is determined that the higher priority learning is in an unconverged state, to cause a degree of reflection of a learning result of the lower priority learning to be lower, than when it is determined that the higher priority learning is in a converged state" may be expressed as a feature that "the learning control portion is configured to execute each of the plurality of kinds of leanings so as to correct the hydraulic-pressure command value, based on the learning result obtained in the each of the plurality of kinds of leanings, wherein the hydraulic-pressure command value is corrected through the lower priority learning by an amount that is smaller when it is determined that the higher priority learning is in the unconverged state, than when it is determined that the higher priority learning is in the converged state".

According to a second aspect of the invention, in the control apparatus according to the first aspect of the invention, the learning control portion is configured to cause the learning result of the lower priority learning to be reflected on the relationship representing the correlation between the hydraulic pressure and the hydraulic-pressure command value, in a case in which a deviation amount variable depending on a condition of the clutch and obtained in the lower priority learning exceeds a predetermined range when it is determined that the higher priority learning is in the unconverged state.

According to a third aspect of the invention, in the control apparatus according to the first or second aspect of the invention, the engaging process of the clutch is sectioned into a plurality of progress phases according to the operation state of the clutch that is changed in the engaging process of the clutch, wherein each of the plurality of kinds of leanings is to be executed in a corresponding one of the progress phases in the engaging process of the clutch, and wherein the plurality of kinds of learnings include a learning that is to be executed for correcting the relationship representing the correlation between the hydraulic pressure and the hydraulic-pressure command value, based on the deviation amount which is variable depending on the condition of the clutch and which is obtained in a period from initiation of a corresponding one of the progress phases until a predetermined time elapses from end of the corresponding one of the progress phases.

According to a fourth aspect of the invention, in the control apparatus according to the third aspect of the invention, the clutch includes a first member that is to be rotated with rotation of the engine and a second member that is to be rotated with rotation of the electric motor, wherein the clutch actuator is configured to eliminate a clearance between the first and second members of the clutch, owing to the hydraulic pressure supplied to the clutch actuator, wherein the plurality of kinds of leanings include a fast-filling-time learning for learning a fast filling time in which a fast-filling hydraulic-pressure command value is outputted for improving a responsiveness of the hydraulic pressure in the clutch actuator so as to quickly eliminate the clearance between the first and second members of the clutch, and wherein the fast-filling-time learning is to be executed for learning the fast filling time, based on the deviation amount which is obtained in a period from initiation of output of the fast-filling hydraulic-pressure command value until a predetermined time elapses from end of the output of the fast-filling hydraulic-pressure command value.

According to a fifth aspect of the invention, in the control apparatus according to any one of the first through fourth aspects of the invention, the learning control portion is configured to update the relationship representing the correlation between the hydraulic pressure and the hydraulic-pressure command value, based on the leaning result of each of the plurality of kinds of learnings, after completion of starting of the engine, when the hydraulic pressure supplied to the clutch actuator is not higher than a predetermined value or when the hydraulic-pressure command value is not being supplied to the hydraulic control unit.

In the control apparatus according to the first aspect of the invention, even when the higher priority learning, which is higher than the lower priority learning in terms of the priority order, is in the unconverged state, the lower priority learning is executed with the degree of reflection of the learning result of the lower priority learning being low, so that it is possible to cause the plurality of kinds of leanings to be quickly progressed while reducing influence of erroneous learning due to the unconverged state of the higher priority learning.

In the control apparatus according to the second aspect of the invention, in the case in which the deviation amount variable depending the condition of the clutch and obtained in the lower priority learning exceeds the predetermined range, the lower priority learning is executed without waiting for convergence of the higher priority learning, so that it is possible to cause the plurality of kinds of leanings to be quickly progressed while reducing influence of erroneous learning due to the unconverged state of the higher priority learning.

In the control apparatus according to the third aspect of the invention, the plurality of kinds of leanings include the learning that is to be executed for correcting the relationship representing the correlation between the hydraulic pressure and the hydraulic-pressure command value, based on the deviation amount which is variable depending on the condition of the clutch and which is obtained in the period from the initiation of the corresponding one of the progress phases until the predetermined time elapses from the end of the corresponding one of the progress phases. The learning can be appropriately executed even in the event of a delay of communication between the control apparatus and a linear solenoid value configured to control the hydraulic pressure supplied to the clutch actuator or a delay of response due to characteristics of the linear solenoid value.

In the control apparatus according to the fourth aspect of the invention, the fast-filling-time learning is executed for learning the fast filling time, based on the deviation amount which is obtained in the period from the initiation of output of the fast-filling hydraulic-pressure command value until the predetermined time elapses from the end of the output of the fast-filling hydraulic-pressure command value. The fast-filling-time learning can be appropriately executed even in the event of the delay of communication between the control apparatus and the linear solenoid value configured to control the hydraulic pressure supplied to the clutch actuator or the delay of response due to characteristics of linear solenoid value.

In the control apparatus according to the fifth aspect of the invention, the relationship representing the correlation between the hydraulic pressure and the hydraulic-pressure command value is updated, based on the leaning result of each of the plurality of kinds of leanings, after completion of the starting of the engine, when the hydraulic pressure supplied to the clutch actuator is not higher than the predetermined value or when the hydraulic-pressure command value is not being supplied to the hydraulic control unit. Thus, when a calculation load applied to the control apparatus is low, the relationship representing the correlation between the hydraulic pressure and the hydraulic-pressure command value is updated based on the leaning result of each of the plurality of kinds of learnings, it is possible to suppress influence on other control operations.

BRIEF DESCRIPTION OF THE DRAWINGS

FIG. 3 is a table for explaining, by way of examples, progress phases that are defined in K0 control phase definitions;

DETAILED DESCRIPTION OF PREFERRED EMBODIMENT

Hereinafter, there will be described preferred embodiment in detail with reference to the accompanying drawings. It is noted that the figures of the drawings are simplified or deformed as needed, and each portion is not necessarily precisely depicted in terms of dimension ratio, shape, etc.

Embodiment

Figure 1:
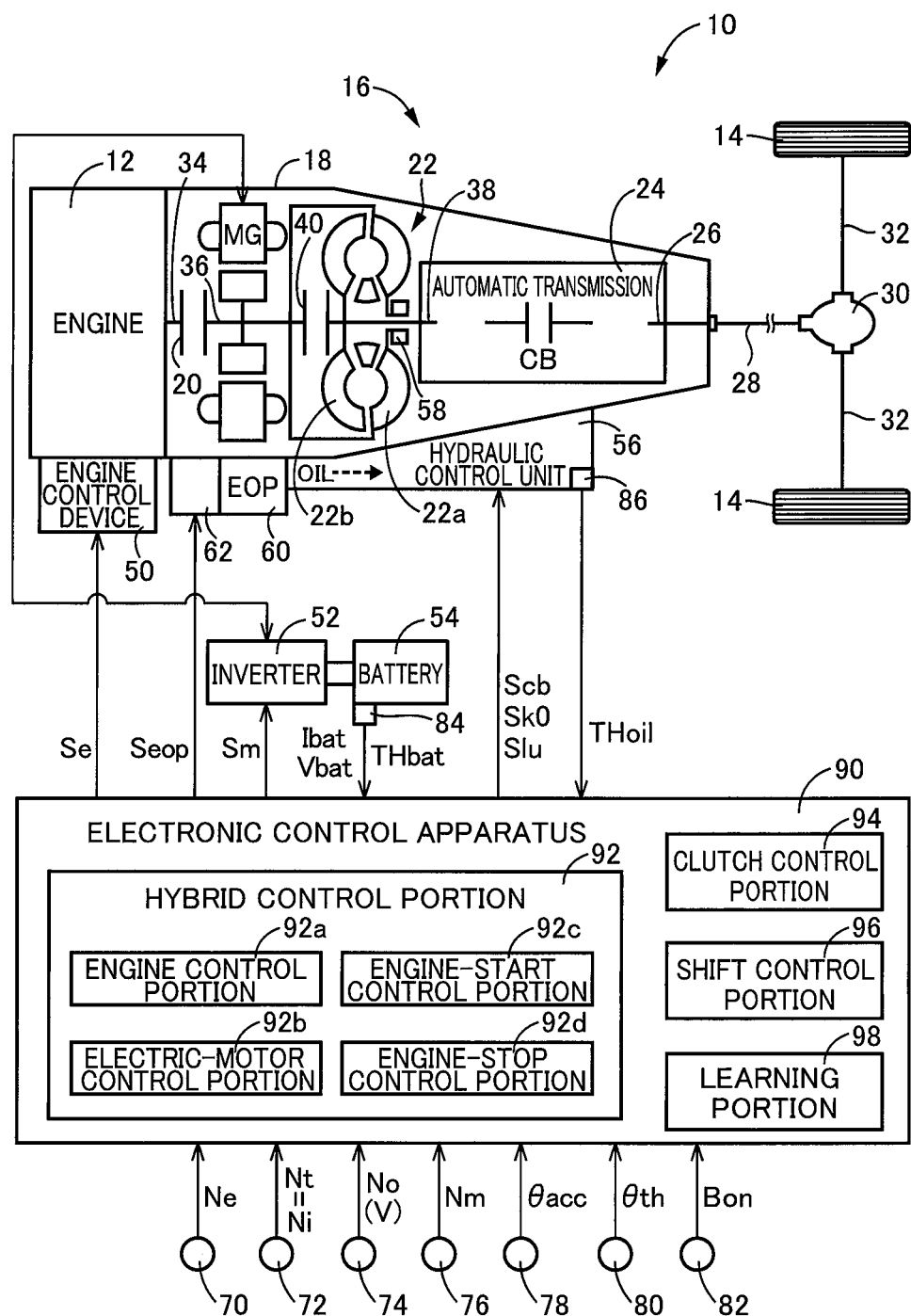
FIG. 1 is a view schematically showing a construction of a vehicle to which the present invention is applied, for explaining major portions of control functions and control systems that are provided to perform various control operations in the vehicle.

FIG. 1 is a view schematically showing a construction of a vehicle 10 to which the present invention is applied, for explaining major portions of control functions and control systems that are provided to perform various control operations in the vehicle 10. As shown in FIG. 1, the vehicle 10 is a hybrid electric vehicle including an engine 12 and an electric MG that serve as drive power source for driving the vehicle 10. The vehicle 10 further includes drive wheels 14 and a power transmission apparatus 16 that is provided in a power transmission path between the engine 12 and the drive wheels 14.

The engine 12 is a known internal combustion engine such as gasoline engine and diesel engine. The vehicle 10 is provided with an engine control device 50 that includes a throttle actuator, a fuel injection device and an ignition device. With the engine control device 50 being controlled by an electronic control apparatus 90 that is described below, an engine torque Te, which is an output torque of the engine 12, is controlled.

The electric motor MG is a rotating electric machine having a function serving as a motor configured to generate a mechanical power from an electric power and a function serving as a generator configured to generate an electric power from a mechanical power. That is, the electric motor MG is a so-called "motor generator". The electric motor MG is connected to a battery 54 provided in the vehicle 10, through an inverter 52 provided in the vehicle 10. The inverter 52 is controlled by the electronic control apparatus 90 whereby an MG torque Tm as an output torque of the electric motor MG is controlled. The MG torque Tm serves as a power driving torque when acting as a positive torque for acceleration, with the electric motor MG being rotated in a forward direction that is the same as a direction of rotation of the engine 12 during operation of the engine 12. The MG torque Tm serves as a regenerative torque when acting as a negative torque for deceleration, with the electric motor MG being rotated in the forward direction. Specifically, the electric motor MG receives the electric power from the battery 54 through the inverter 52, and generates the power for driving the vehicle 10, in place of or in addition to the engine 12. Further, the electric motor MG generates the electric power based on the power of the engine 12 or a driven power transmitted from the drive wheels 14. The electric power generated by the electric motor MG is supplied to the battery 54 through the inverter 52 so as to be stored in the battery 54. The battery 54 is an electric storage device to and from which the electric power is supplied from and to the electric motor MG. The electric power corresponds to an electric energy unless they are to be distinguished from each other. The power corresponds to a force or a torque unless they are to be distinguished from each other.

The power transmission apparatus 16 includes a casing 18 as a non-rotary member that is attached to a body of the vehicle 10, a K0 clutch 20 provided in the power transmission path between the engine 12 and the drive wheels 14, a torque converter 22 connected to the engine 12 through the K0 clutch 20 and an automatic transmission 24 connected to the torque converter 22. The K0 clutch 20, electric motor MG, torque converter 22 and automatic transmission 24 are disposed inside the casing 18. The torque converter 22 and the automatic transmission 24 constitute respective parts of the power transmission path between the engine 12 and the drive wheels 14. The automatic transmission 24 is disposed in a power transmission path between the torque converter 22 and the drive wheels 14. The power transmission apparatus 16 further includes a propeller shaft 28 connected to a transmission output shaft 26 that is an output rotary member of the automatic transmission 24, a differential gear device 30 connected to the propeller shaft 28, and a pair of drive shafts 32 connected to the differential gear device 30. The power transmission apparatus 16 still further includes an engine connection shaft 34 connecting between the engine 12 and the K0 clutch 20, and an electric-motor connection shaft 36 connecting between the K0 clutch 20 and the torque converter 22.

The electric motor MG is connected to the electric-motor connection shaft 36 in a power transmittable manner in the casing 18. The electric motor MG is disposed in the power transmission path between the engine 12 and the drive wheels 14, so as to be connected to the engine 12 and the drive wheels 14 in a power transmittable manner, more specifically, the electric motor MG is disposed in a power transmission path between the K0 clutch 20 and the torque converter 22, so as to be connected to the K0 clutch 20 and the torque converter 22 in a power transmittable manner. That is, the electric motor MG is connected to the torque converter 22 and the automatic transmission 24 without through the K0 clutch 20 in a power transmittable manner. From another point of view, the torque converter 22 and the automatic transmission 24 constitute respective parts of a power transmission path between the electric motor MG and the drive wheels 14. The torque converter 22 and the automatic transmission 24 transmit a drive power of the engine 12 and/or a drive power of the electric motor MG to the drive wheels 14.

The torque converter 22 includes a pump impeller 22a connected to the electric-motor connection shaft 36, and a turbine impeller 22b connected to a transmission input shaft 38 that is an input rotary member of the automatic transmission 24. The pump impeller 22a is connected to the engine 12 through the K0 clutch 20, and is connected directly to the electric motor MG. The pump impeller 22a is an input member of the torque converter 22, while the turbine impeller 22b is an output member of the torque converter 22. The electric-motor connection shaft 36 serves also as an input rotary member of the torque converter 22.

The transmission input shaft 38 serves also as an output rotary member of the torque converter 22, which is formed integrally with a turbine shaft that is to be rotated by the turbine impeller 22b. The torque converter 22 is a fluid-type transmission device, and is configured to transmit the drive powers of the drive power sources in the form of the engine 12 and the electric motor MG, to the transmission input shaft 38, through fluid circulating in the torque converter 22. The torque converter 22 includes an LU clutch 40 configured to connect between the pump impeller 22a and the turbine impeller 22b. The LU clutch 40 is a known lockup clutch serving as a direct connection clutch configured to connect between the input and output rotary members of the torque converter 22.

The LU clutch 40 is configured to receive an LU hydraulic pressure PRlu that is a regulated hydraulic pressure supplied from a hydraulic control unit (hydraulic control circuit) 56 provided in the vehicle 10, whereby an LU torque Tlu, i.e., torque capacity of the LU clutch 40 is changed and its control or operation state is switched. As the operation state of the LU clutch 40, there are a fully released state in which the LU clutch 40 is fully released, a slipped state in which the LU clutch 40 is engaged with slipping, and a fully engaged state in which the LU clutch 40 is fully engaged. When the LU clutch 40 is placed in the fully released state, the torque converter 22 is placed in a torque converter state in which a torque boosting effect is obtained. When the LU clutch 40 is placed in the fully engaged state, the torque converter 22 is placed in a lockup state in which the pump impeller 22a and the turbine impeller 22b are rotated integrally with each other.

The automatic transmission 24 is a known automatic transmission of a planetary gear type which includes at least one planetary gear device and a plurality of engagement devices CB. Each of the engagement devices CB is a hydraulically-operated frictional engagement device in the form of a multiple-disc type or a single-disc type clutch or brake that is to be pressed by a hydraulic actuator, or a band brake that is to be tightened by a hydraulic actuator. Each of the engagement devices CB is configured to receive a CB hydraulic pressure PRcb that is a regulated hydraulic pressure supplied from the hydraulic control unit 56, whereby a CB torque Tcb, i.e., torque capacity of the engagement device CB is changed and its control or operation state is switched between an engaged state and a released state, for example.

The automatic transmission 24 is a step-variable automatic transmission configured to establish a selected one of a plurality of gear positions, with a corresponding one or ones of the engagement devices CB being engaged, wherein the gear positions are different from each other in gear ratio (speed ratios) γmat (=AT input rotational speed Ni/AT output rotational speed No). The automatic transmission 24 is configured to switch from one of the AT gear positions to another one of the AT gear positions, namely, to establish one of the AT gear positions which is selected, by the electronic control apparatus 90, depending on, for example, an accelerating operation made by a vehicle driver (operator) and the vehicle running speed V. The AT input rotational speed Ni is a rotational speed of the transmission input shaft 38, and is an input rotational speed of the automatic transmission 24. The AT input rotational speed Ni is also a rotational speed of the output rotary member of the torque converter 22, and is equal to a turbine rotational speed Nt that is an output rotational speed of the torque converter 22. Therefore, the AT input rotational speed Ni can be represented by the turbine rotational speed Nt. The AT output rotational speed No is a rotational speed of the transmission output shaft 26, and is an output rotational speed of the automatic transmission 24.

The K0 clutch 20 is a wet-type or dry-type frictional engagement device constituted by a multiple-disc type or single-disc type clutch that is to be pressed by, for example, a hydraulic clutch actuator 120 that is described below. With the clutch actuator 120 being controlled by the electronic control apparatus 90, a control or operation state of the K0 clutch 20 is switched between an engaged state and a released state, for example. It is noted that the K0 clutch 20 corresponds to "clutch" recited in the appended claims.

Figure 2:
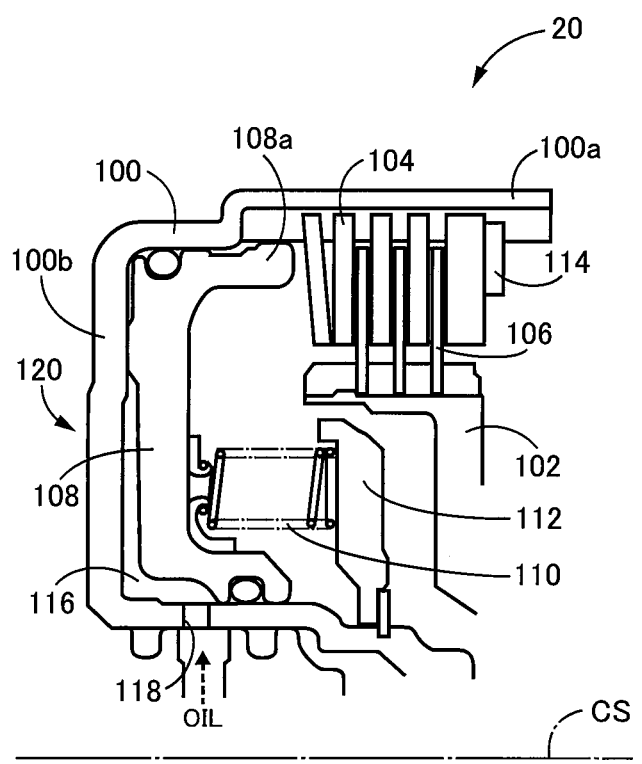
FIG. 2 is a partial cross-sectional view showing, by way of example, a K0 clutch.

FIG. 2 is a partial cross-sectional view showing, by way of example, the K0 clutch 20. As shown in FIG. 2, the K0 clutch 20 includes a clutch drum 100, a clutch hub 102, a plurality of separate plates 104, a plurality of friction plates 106, a piston 108, a return spring 110, a spring receiver plate 112 and a snap ring 114. The clutch drum 100 and the clutch hub 102 are both disposed on an axis CS that is aligned with axes of respective shafts such as the engine connection shaft 34 and the electric-motor connection shaft 36. It is noted that FIG. 2 shows a part of an outer peripheral portion of the K0 clutch 20 wherein the part is located on an upper side of the axis CS.

The clutch drum 100 is connected to the engine connection shaft 34 so as to be rotated integrally with the engine connection shaft 34. The clutch hub 102 is connected to the electric-motor connection shaft 36 so as to be rotated integrally with the electric-motor connection shaft 36. Each of the separate plates 104 has a generally annular shape, and is splined or fitted at its outer peripheral end portion to an inner circumferential surface of a cylindrical portion 100a of the clutch drum 100, such that the separate plates 104 are not rotatable relative to the clutch drum 100. Each of the friction plates 106, which also has a generally annular shape, is interposed between corresponding adjacent two of the separate plates 104 and is splined or fitted at its inner peripheral end portion to an outer circumferential surface of the clutch hub 102, such that the friction plates 106 are not rotatable relative to the clutch hub 102. The piston 108 includes a pressing portion 108a extending from its outer peripheral end portion toward the separate plates 104 and the friction plates 106. The return spring 110 is interposed between the piston 108 and the spring receiver plate 112 that is fixed to the clutch drum 100 so as to constantly force the piston 108 toward a bottom plate portion 100b of the clutch drum 100 such that a part of the piston 108 can be brought into contact with the bottom plate portion 100b of the clutch drum 100. That is, the return spring 110 serves as a spring element biasing or constantly forcing the piston 108 in a direction that causes the separate plates 104 to be disengaged from the friction plates 106. The snap ring 114 is fixed in the inner circumferential surface of the cylindrical portion 100a of the clutch drum 100 so as to be located in a position that makes the snap ring 114 cooperate with the pressing portion 108a of the piston 108 to sandwich the separate plates 104 and the friction plates 106. It is noted that each of the separate plates 104 corresponds to "first member" recited in the appended claims and that each of the friction plates 106 corresponds to "second member" recited in the appended claims.

The K0 clutch 20 has a fluid chamber 116 defined between the piston 108 and the bottom plate portion 100b of the clutch drum 100. The clutch drum 100 has a fluid passage 118 that is in communication with the fluid chamber 116. In the K0 clutch 20, the above-described clutch drum 100, piston 108, return spring 110, spring receiver plate 112 and fluid chamber 116 cooperate with one another to constitute a clutch actuator 120 as a hydraulic actuator.

The hydraulic control unit 56 is configured to supply a K0 hydraulic pressure PRk0 that is a regulated hydraulic pressure, to the clutch actuator 120. In the K0 clutch 20, when the K0 hydraulic pressure PRk0 is supplied from the hydraulic control unit 56 to the fluid chamber 116 through the fluid passage 118, the piston 108 is moved, by the supplied K0 hydraulic pressure PRk0, toward the separate plates 104 and the friction plates 106, against a biasing force of the return spring 110, whereby the separate plates 104 and the friction plates 106 are pressed by the pressing portion 108a of the piston 108, so that the K0 clutch 20 is placed into its engaged state. A K0 torque Tk0, which is a torque capacity of the K0 clutch 20, is changed with change of an operation state of the K0 clutch 20 that is changed depending on the K0 hydraulic pressure PRk0. It is noted that the torque capacity of each of the engagement devices such as the LU torque Tlu, CB torque Tcb and K0 torque Tk0 corresponds to a maximum transmission torque, i.e., a maximum torque that can be transmitted by the engagement device. The maximum torque of each engagement device is different from a transmitted torque that is actually transmitted by the engagement device, in a narrow sense. However, in the following description regarding the present embodiment, the actually transmitted torque represents the maximum torque unless otherwise specified, in the following description regarding the present embodiment. For example, the K0 torque Tk0 is synonymous with the transmitted torque transmitted by the K0 clutch 20.

The K0 torque Tk0 is dependent on, for example, the K0 hydraulic pressure PRk0 and a friction coefficient of a friction member of each of the friction plates 106. In the K0 clutch 20, when the fluid chamber 116 is filled with a working fluid OIL, a clearance between each of the separate plates 104 and a corresponding one of the friction plates 106 is eliminated by a pressing force (=PRk0×piston pressure-receiving area) of the piston 108 that acts against the biasing force of the return spring 110, namely, a pack clearance of the K0 clutch 20 is eliminated. In the following description regarding the present embodiment, a state in which the pack clearance of the K0 clutch 20 is eliminated will be referred to as "pack-clearance-elimination completion state". In the K0 clutch 20, the K0 torque Tk0 is generated with the K0 hydraulic pressure PRk0 being further increased from the pack-clearance-elimination completion state. That is, in the K0 clutch 20, the pack-clearance-elimination completion state is a state in which the K0 clutch 20 starts to have the torque capacity, namely, the K0 torque Tk0 starts to be generated, if the K0 hydraulic pressure PRk0 is increased from the pack-clearance-elimination completion state. The K0 hydraulic pressure PRk0 required for packing the K0 clutch 20 is the K0 hydraulic pressure PRk0 required for establishing a state in which the piston 108 reaches its stroke end and the K0 torque Tk0 is not generated yet. It is noted that each of the separate plates 104 corresponds to "first member" recited in the appended claims and that each of the friction plates 106 corresponds to "second member" recited in the appended claims.

Referring back to FIG. 1, when the K0 clutch 20 is engaged, the pump impeller 22a and the engine 12 are to be rotated integrally with each other through the engine connection shaft 34. That is, the K0 clutch 20 connects between the engine 12 and the drive wheels 14 in a power transmittable manner, when being engaged. On the other hand, when the K0 clutch 20 is released, transmission of a power between the engine 12 and the pump impeller 22a is interrupted. That is, the K0 clutch 20 separates connection between the engine 12 and the drive wheels 14, when being released. The K0 clutch 20 is disposed in the power transmission path between the engine 12 and the electric motor MG that is connected to the pump impeller 22a, and serves as a clutch configured to cut off the power transmission path between the engine 12 and the electric motor MG, namely, to disconnect the engine 12 from the electric motor MG. That is, the K0 clutch 20 is a clutch configured to connect between the engine 12 and the electric motor MG, when being engaged, and to separate the connection between the engine 12 and the electric motor MG, when being released.

In the power transmission apparatus 16, the power outputted from the engine 12 is transmitted, when the K0 clutch 20 is engaged, to the drive wheels 14 from the engine connection shaft 34 through sequentially the K0 clutch 20, electric-motor connection shaft 36, torque converter 22, automatic transmission 24, propeller shaft 28, differential gear device 30 and drive shafts 32, for example. Further, the power transmitted from the electric motor MG is transmitted, irrespective of the operation state of the K0 clutch 20, to the drive wheels 14 from the electric-motor connection shaft 36 through sequentially the torque converter 22, automatic transmission 24, propeller shaft 28, differential gear device 30 and drive shafts 32, for example.

The vehicle 10 further includes an MOP 58 that is a mechanically-operated oil pump, an EOP 60 that is an electrically-operated oil pump, and a pump motor 62. The MOP 58 is connected to the pump impeller 22a, and is to be rotated and driven by the drive power source or sources (i.e., engine 12 and/or electric motor MG), so as to output a working fluid OIL that is to be used in the power transmission apparatus 16. The pump motor 62 is a motor serving exclusively to rotate and drive the EOP 60. The EOP 60 outputs the working fluid OIL, when being rotated and driven by the pump motor 62. The working fluid OIL outputted by the MOP 58 and the EOP 60 is supplied to the hydraulic control unit 56. The hydraulic control unit 56, which receives the working fluid OIL as an original hydraulic pressure, supplies regulated hydraulic pressures that serve as the CB hydraulic pressure PRcb, the K0 hydraulic pressure PRk0 and the LU hydraulic pressure PRlu, for example.

The vehicle 10 is provided with the electronic control apparatus 90 as a controller including the control apparatus which is constructed according to the present invention and which is configured to control starting of the engine 12, for example. The electronic control apparatus 90 includes a so-called microcomputer incorporating a CPU, a ROM, a RAM and an input-output interface. The CPU performs various control operations of the vehicle 10, by processing various input signals, according to control programs stored in the ROM, while utilizing a temporary data storage function of the RAM. The electronic control apparatus 90 may be constituted by two or more control units exclusively assigned to perform respective different control operations such as an engine control operation, an electric-motor control operation and a hydraulic-pressure control operation, as needed.

The electronic control apparatus 90 receives various input signals based on values detected by respective sensors provided in the vehicle 10. Specifically, the electronic control apparatus 90 receives: an output signal of an engine speed sensor 70 indicative of an engine rotational speed Ne that is a rotational speed of the engine 12; an output signal of a turbine speed sensor 72 indicative of a turbine rotational speed Nt that is equal to the AT input rotational speed Ni; an output signal of an output speed sensor 74 indicative of the AT output rotational speed No corresponding to the vehicle running speed V; an output signal of a MG speed sensor 76 indicative of the motor rotational speed Nm; an output signal of an accelerator-opening degree sensor 78 indicative of an accelerator opening degree (accelerator operation degree) θacc representing an amount of accelerating operation made by the vehicle driver; an output signal of a throttle-opening degree sensor 80 indicative of a throttle opening degree θth which is an opening degree of an electronic throttle valve; an output signal of a brake switch 82 indicative of a signal representing a state in which a brake pedal is being operated by the vehicle driver so as to operate wheel brakes; an output signal of a battery sensor 84 indicative of a battery temperature THbat, a battery charging/discharging electric current that and a battery voltage Vbat; and an output signal of a fluid temperature sensor 86 indicative of a working-fluid temperature THoil that is a temperature of the working fluid OIL in the hydraulic control unit 56.

The electronic control apparatus 90 generates various output signals to the various devices provided in the vehicle 10, such as: an engine control command signal Se that is to be supplied to the engine control device 50 for controlling the engine 12, an MG control command signal Sm that is to be supplied to the inverter 52 for controlling the electric motor MG; a CB hydraulic control command signal Scb that is to be supplied to the hydraulic control unit 56 for controlling the operation states of the engagement devices CB; a K0 hydraulic control command signal Sko that is to be supplied to the hydraulic control unit 56 for controlling the K0 clutch 20; an LU hydraulic control command signal SLU that is to be supplied to the hydraulic control unit 56 for controlling the operation state of the LU clutch 40; and an EOP control command signal Seop that is to be supplied to the pump motor 62 for controlling the EOP 60.

For performing various control operations in the vehicle 10, the electronic control apparatus 90 includes a hybrid control means in the form of a hybrid control portion 92, a clutch control means in the form of a clutch control portion 94, and a shift control means in the form of a shift control portion 96.

The hybrid control portion 92 has a function serving as an engine control means in the form of an engine control portion 92*a* for controlling operation of the engine 12 and a function serving as an electric-motor control means in the form of an electric-motor control portion 92*b* for controlling operation of the electric motor MG through the inverter 52, and executes a hybrid-drive control operation, for example, using the engine 12 and the electric motor MG through these control functions.

The hybrid control portion 92 calculates a requested drive amount of the vehicle 10 requested by the vehicle driver, by applying the accelerator opening degree θacc and the vehicle running speed V, for examples, to a requested drive amount map that represents a pre-stored relationship obtained by experimentation or determined by an appropriate design theory. The requested drive amount is, for example, a requested drive torque Trdem of the drive wheels 14. From another point of view, the requested drive torque Trdem [Nm] is a requested drive power Proem [W] at the current vehicle running speed V. As the requested drive amount, another value such as a requested drive force Frdem [N] of the drive wheels 14 and a requested AT output torque of the transmission output shaft 26 may be used, too. In the calculation of the requested drive amount, it is also possible to use, for example, the AT output rotational speed No in place of the vehicle running speed V.

The hybrid control portion 92 outputs the engine control command signal Se and the MG control command signal Sm for controlling the engine 12 and the electric motor MG, respectively, such that the requested drive power Prdem is realized, by taking account of various factors such as a transmission loss, an auxiliary load, the gear ratio γat of the automatic transmission 24 and the maximum chargeable amount Win and maximum dischargeable amount Wout of the battery 54. The engine control command signal Se is, for example, a command value of an engine power Pe that is the power of the engine 12 outputting the engine torque Te at the current engine rotational speed Ne. The MG control command signal Sm is, for example, a command value of a consumed electric power Wm of the electric motor MG outputting the MG torque Tm at the current motor rotational speed Nm.

The maximum chargeable amount Win of the battery 54 is a maximum amount of the electric power that can be charged to the battery 54, and represents a limitation of the electric power inputted to the battery 54, namely, a limitation of input to the battery 54. The maximum dischargeable amount Wout of the battery 54 is a maximum amount of the electric power that can be discharged from the battery 54, and represents a limitation of the electric power outputted from the battery 54, namely, a limitation of output of the battery 54. The maximum chargeable and dischargeable amounts Win, Wout are calculated by the electronic control apparatus 90, for example, based on the battery temperature THbat and a state-of-charge value SOC [%] of the battery 54. The state-of-charge value SOC of the battery 54 is a value indicative of a charged state of the battery 54, i.e., an amount of the electric power stored in the battery 54, and is calculated by the electronic control apparatus 90, for example, based on the charging/discharging electric current Ibat and the voltage Vbat of the battery 54.

When the requested drive torque Trdem can be covered by only the output of the electric motor MG, the hybrid control portion 92 establishes a motor driving (=EV driving) mode as a driving mode. When the EV driving mode is established, the hybrid control portion 92 causes the vehicle 10 to perform an EV driving (electric motor driving) with the K0 clutch 20 being released and with only the electric motor MG serving as the drive power source. On the other hand, when the requested drive torque Trdem cannot be covered without at least the output of the engine 12, the hybrid control portion 92 establishes another driving mode that is an engine driving mode, i.e., a hybrid driving (=HV driving) mode. When the HV driving mode is established, the hybrid control portion 92 causes the vehicle 10 to perform an engine driving, i.e., an HV driving (hybrid driving) with the K0 clutch 20 being engaged and with at least the engine 12 serving as the drive power source. Further, even when the requested drive torque Trdem can be covered by only the output of the electric motor MG, the hybrid control portion 92 establishes the HV driving mode, for example, in a case in which the state-of-charge value SOC of the battery 54 becomes less than a predetermined engine-start threshold value or in a case in which the engine 12 or other component needs to be warmed up. The engine-start threshold value is a predetermined threshold value for determining that the state-of-charge value SOC reaches a level at which the engine 12 must forcibly be started for charging the battery 54. Thus, the hybrid control portion 92 switches between the EV driving mode and the HV driving mode, based on, for example, the requested drive torque Trdem, by automatically stopping the engine 12 during the HV driving, restarting the engine 12 after the stop of the engine 12, and staring the engine 12 during the EV driving.

The hybrid control portion 92 further has a function serving as an engine-start control means in the form of an engine-start control portion 92c and a function serving as an engine-stop control means in the form of an engine-stop control portion 92d.

The engine-start control portion 92c determines whether the starting of the engine 12 is requested or not. This determination is made, for example, depending on (i) whether the requested drive torque Trdem has been made larger than a range that can be covered by only the output of the electric motor MG in the EV driving mode, (ii) whether the engine 12 or other component needs to be warmed up in the EV driving mode, or (iii) the state-of-charge value SOC of the battery 54 is less than the engine-start threshold value in the EV driving mode. Further, the engine-start control portion 92c determines whether an engine-start control operation for starting the engine 12 has been completed or not.

The clutch control portion 94 controls the K0 clutch 20 for executing the engine-start control operation for starting the engine 12. For example, when it is determined by the engine-start control portion 92c that the starting of the engine 12 is requested, the clutch control portion 94 outputs a K0 hydraulic-pressure control command signal Sk0 that is supplied to the hydraulic control unit 56, wherein the K0 hydraulic-pressure control command signal Sk0 requests switching of the K0 clutch 20 from the released state to the engaged state for obtaining the K0 torque Tk0 by which a required torque is transmitted toward the engine 12, and wherein the required torque is a torque required to increase the engine rotational speed Ne and to crank the engine 12. That is, when the engine 12 is to be started, the clutch control portion 94 supplies, to the hydraulic control unit 56, the K0 hydraulic-pressure control command signal Sk0 by which the clutch actuator 120 is controlled to switch the operation state of the K0 clutch 20 from the released state to the engaged state. In the following description regarding the present embodiment, the required torque required to crank the engine 12 will be referred to as "required cranking torque Tcrn".

The engine-start control portion 92c controls the engine 12 and the electric motor MG to execute the engine-start control operation for starting the engine 12. For example, when determining that the starting of the engine 12 is requested, the engine-start control portion 92c is configured, upon switching of the K0 clutch 20 to the engaged state, to supply, to the inverter 52, the MG control command signal Sm requesting the electric motor MG to output the required cranking torque Tcrn. That is, when the engine 12 is to be started, the engine-start control portion 92c supplies, to the inverter 52, the MG control command signal Sm by which the electric motor MG is controlled to output the required cranking torque Tcrn, namely, by which the MG torque Tm is increased by an amount corresponding to the required cranking torque Tcrn.

Further, when determining that the starting of the engine 12 is requested, the engine-start control portion 92c is configured, in conjunction of the cranking of the engine 12 by cooperation of the K0 clutch 20 and the electric motor MG, to supply, to the engine control device 50, the engine control command signal Se by which a fuel supply and an engine ignition are started. That is, for starting the engine 12, the engine-start control portion 92c supplies, to the engine control device 50, the engine control command signal Se for controlling the engine 12 so as to start the engine 12.

When the engine 12 is cranked, a cranking reaction force Trfc is generated, namely, a reaction torque is generated as a result of engagement of the K0 clutch 20. This cranking reaction force Trfc causes feeling of deceleration of the vehicle 10, namely, drop of a drive torque Tr, due to inertia during the starting of the engine 12. Therefore, when the engine 12 is to be started, the MG torque Tm is increased by the required cranking torque Tcrn which cancels the cranking reaction force Trfcr, namely, which corresponds to a K0 reaction compensation torque compensating the cranking reaction force Trfcr. The required cranking torque Tcrn, which is the K0 torque Tk0 required for cranking the engine 12, is to be transmitted from the electric motor MG to the engine 12 through the K0 clutch 20. The required cranking torque Tcrn is, for example, a certain cranking torque Tcr that is predetermined based on, for example, a specifications of the engine 12 and a method of starting the engine 12.

When the engine 12 is to be started during the EV driving, the engine-start control portion 92c causes the electric motor MG to output the MG torque Tm corresponding to the required cranking torque Tcrn in addition to the MG torque Tm corresponding to the drive torque Tr required for the EV driving. To this end, during the EV driving, the required cranking torque Tcrn needs to be available or assured in preparation for the starting of the engine 12. Therefore, when the engine-start control operation is to be executed, the determination as to whether the requested drive torque Trdem can be covered by only the output of the electric motor MG or not, is made by comparing the requested drive torque Trdem with a torque value obtained by subtracting the required cranking torque Tcrn from an outputtable maximum torque of the electric motor MG. The outputtable maximum torque of the electric motor MG is an outputtable maximum value of the MG torque Tm which is dependent on the maximum dischargeable amount Wout of the battery 54.

The engine-stop control portion 92d determines whether the stop of the engine 12 is requested or not in the EV driving mode. In this determination, an affirmative determination is made, for example, when (i) the requested drive torque Trdem is not larger than the range that can be covered by only the output of the electric motor MG, (ii) the engine 12 or other component do not need to be warmed up, and (iii) the state-of-charge value SOC of the battery 54 is not less than the engine-start threshold value.

The engine-stop control portion 92d controls the engine 12, so as to stop the engine 12 as needed. When determining that the stop of the engine 12 is requested, for example, the engine-stop control portion 92d supplies, to the engine control device 50, the engine control command signal Se by which the fuel supply to the engine 12 is stopped. That is, when the engine 12 is to be stopped, the engine-stop control portion 92d supplies, to the engine control device 50, the engine control command signal Se by which the engine 12 is controlled to be stopped.

When the engine 12 is controlled to be stopped, the clutch control portion 94 controls the K0 clutch 20. For example, when it is determined by the engine-stop control portion 92d that the stop of the engine 12 is requested, the clutch control portion 94 supplies, to the hydraulic control unit 56, the K0 hydraulic-pressure control command signal Sk0 by which the K0 clutch 20 is controlled to be placed into the released state. That is, the clutch control portion 94 supplies, to the hydraulic control unit 56, the K0 hydraulic-pressure control command signal Sk0 by which the operation state of the K0 clutch 20 is switched from the engaged state to the released state when the stop of the engine 12 is requested.

The shift control portion 96 determines whether a shifting action is to be executed in the automatic transmission 24, by using, for example, a shifting map that represents a predetermined relationship, and outputs the CB hydraulic control command signal Scb, as needed, which is supplied to the hydraulic control unit 56, for executing the shifting action in the automatic transmission 24. In the shifting map, the predetermined relationship is represented by shifting lines in two-dimensional coordinates in which the vehicle running speed V and the requested drive torque Trdem as two variables are taken along respective two axes, wherein the shifting lines are used for the determination as to whether the shifting action is to be executed in the automatic transmission 24. In the shifting map, one of the two variables may be the AT output rotational speed No in place of the vehicle running speed V, and the other of the two variables may be any one of the requested drive force Frdem, accelerator opening degree θacc and throttle opening degree θth in place of the requested drive torque Trdem.

For the purpose of accurately control the operation state of the K0 clutch 20 in an engaging process of the K0 clutch 20 for the starting of the engine 12, the engaging process is sectioned into a plurality of progress phases according to the operation state of the K0 clutch 20, which are defined in K0 control phase definitions Dphk0 predetermined for controlling the clutch actuator 120.

FIG. 3 is a table for explaining, by way of examples, the progress phases that are defined in the K0 control phase definitions Dphk0. As shown in FIG. 3, the K0 control phase definitions Dphk0 defines the progress phases such as "K0standby", "quick apply", "packing-stage constant-pressure standby", "K0 cranking", "quick drain", "pre-reengaging constant-pressure standby", "rotational-synchronization initial-stage", "rotational-synchronization intermediate-stage", "rotational-synchronization final-stage", "engagement transition sweep", "full-engagement transition sweep", "full engagement", "backup sweep" and "calculation stop".

The "K0standby" phase is a progress phase in which the K0 clutch 20 is in standby without control of the K0 clutch 20 being initiated, in the engine-start control operation for starting the engine 12. This "K0 standby" phase is executed when a K0 standby determination is made upon initiation of the engine-start control operation.

The "quick apply" phase is a progress phase in which a quick apply is executed for improving an initial responsiveness of the K0 hydraulic pressure PRk0, so as to quickly complete packing of the K0 clutch 20, namely, as to quickly eliminate the clearance between each of the separate plates 104 and a corresponding one of the friction plates 106 in the K0 clutch 20, wherein the quick apply is outputting a command value of the K0 hydraulic pressure PRk0 that is temporarily high. This "quick apply" phase is executed when the K0standby determination is not made upon initiation of the engine-start control operation. Further, the above-described "K0 standby" phase is transited to this "quick apply" phase, when the K0 standby determination is cancelled in the "K0 standby" phase in which the K0 clutch 20 is in standby.

The command value of the K0 hydraulic pressure PRk0 is a hydraulic-pressure command value outputted for supplying the regulated K0 hydraulic pressure PRk0 to the hydraulic control unit 56. In the following description regarding the present embodiment, the command value of the K0 hydraulic pressure PRk0 will be referred to as "K0 hydraulic-pressure command value Spk0". The K0 hydraulic-pressure command value Spk0 is converted into a command electric current that is supplied to a solenoid driver for driving a K0-clutch solenoid valve, wherein the solenoid driver is provided in the electronic control apparatus 90. The K0-clutch solenoid valve, which is provided in the hydraulic control unit 56, is a solenoid value configured to output the K0 hydraulic pressure PRk0 that is supplied to the K0 clutch 20. The K0 hydraulic-pressure control command signal Sk0 is the command electric current that is supplied to the solenoid driver for the driving the K0-clutch solenoid valve, or a drive current or drive voltage that is supplied by the solenoid driver. That is, the K0 hydraulic-pressure command value Spk0 is converted into the K0 hydraulic-pressure control command signal Sk0, and the K0 hydraulic-pressure control command signal Sk0 is outputted to be supplied to the hydraulic control unit 56. In the following description regarding the present embodiment, the K0 hydraulic-pressure command value Spk0 and the K0 hydraulic-pressure control command signal Sk0 are regarded to correspond to each other, for convenience of the description.

The "packing-stage constant-pressure standby" phase is a progress phase for standing by with a constant pressure, so as to complete the packing of the K0 clutch 20. The above-described "quick apply" phase is transited to this "packing-stage constant-pressure standby" phase, when the quick apply is completed.

The "K0 cranking" phase is a progress phase in which the cranking of the engine 12 is executed by the K0 clutch 20. The above-described "packing-stage constant-pressure standby" phase is transited to this "K0 cranking" phase, when the packing of the K0 clutch 20 is completed.

The "quick drain" phase is a progress phase in which a quick drain is executed for improving the initial responsiveness of the K0 hydraulic pressure PRk0, so as to quickly standby with a certain value of the K0 hydraulic pressure PRk0, e.g., a packing-end pressure PRk0pk, in the subsequent progress phase in the form of a "pre-reengaging constant-pressure standby" phase, wherein the quick drain is outputting the K0 hydraulic-pressure command value Spk0 that is temporarily low. The above-described "K0 cranking" phase is transited to this "quick drain" phase, when a quick-drain execution determination is made upon completion of the cranking of the engine 12.

The "pre-reengaging constant-pressure standby" phase is a progress phase for standing by with a certain value of the K0 torque Tk0, so as to avoid disturbance to a complete explosion of the engine 12. The complete explosion of the engine 12 is, for example, a state in which self-rotation of the engine 12 is stabilized by explosion of the engine 12 after an initial combustion in which ignition of the engine 12 is initiated. To avoid the disturbance to the complete explosion of the engine 12 is to avoid from disturbing the self-rotation of the engine 12. The above-described "K0 cranking" phase is transited to this "pre-reengaging constant-pressure standby" phase, when the quick-drain execution determination is not made upon completion of the cranking of the engine 12. Further, the above-described "quick drain" phase is transited to this "quick apply" phase when the quick drain is completed.

The "rotational-synchronization initial-stage" phase is a progress phase in which the K0 torque Tk0 is controlled to assist increase of the engine rotational speed Ne, so as to quickly synchronize the engine rotational speed Ne and the MG rotational speed Nm to each other. The above-described "pre-reengaging constant-pressure standby" phase is transited to this "rotational-synchronization initial-stage" phase, in a case in which neither a condition for transition to the "rotational-synchronization final-stage" phase nor a condition for transition to the "rotational-synchronization intermediate-stage" phase is satisfied when the complete explosion of the engine 12 is notified by the engine control portion 92a. It is noted that the engine control portion 92a outputs a complete explosion notification notifying the complete explosion of the engine 12, for example, when a time from a point time at which the engine rotational speed Ne reaches a predetermined complete-explosion rotational speed exceeds a predetermined complete-explosion-notification standby time TMeng (see FIG. 4). The complete-explosion-notification standby time TMeng is predetermined by taking account of, for example, a requirement regarding an exhaust gas of the engine 12.

The "rotational-synchronization intermediate-stage" phase is a progress phase in which the K0 torque Tk0 is controlled such that a racing amount (=Ne−Nm) becomes an appropriate value, namely, such that a difference between the engine rotational speed Ne and the MG rotational speed Nm becomes the appropriate value. The above-described "pre-reengaging constant-pressure standby" phase is transited to this "rotational-synchronization intermediate-stage" phase, in a case in which the condition for transition to the "rotational-synchronization intermediate-stage" phase is satisfied when the complete explosion of the engine 12 is notified by the engine control portion 92a. Further, the above-described "rotational-synchronization initial-stage" phase is transited to this "rotational-synchronization intermediate-stage" phase, in a case in which the condition for transition to the "rotational-synchronization intermediate-stage" phase is satisfied during the "rotational-synchronization initial-stage" phase.

The "rotational-synchronization final-stage" phase is a progress phase in which the K0 torque Tk0 is controlled to synchronize the engine rotational speed Ne and the MG rotational speed Nm to each other. The above-described "pre-reengaging constant-pressure standby" phase is transited to this "rotational-synchronization final-stage" phase, in a case in which the condition for transition to the "rotational-synchronization final-stage" phase is satisfied when the complete explosion of the engine 12 is notified by the engine control portion 92a. Further, the above-described "rotational-synchronization initial-stage" phase is transited to this "rotational-synchronization final-stage" phase, in a case in which the condition for transition to the "rotational-synchronization final-stage" phase is satisfied during execution of the "rotational-synchronization initial-stage" phase. Still further, the above-described "rotational-synchronization intermediate-stage" phase is transited to this "rotational-synchronization final-stage" phase, in a case in which the condition for transition to the "rotational-synchronization final-stage" phase is satisfied during execution of the "rotational-synchronization intermediate-stage" phase. Still further, the above-described "rotational-synchronization intermediate-stage" phase is transited to this "rotational-synchronization final-stage" phase, in a case in which a synchronization unable state continues for at least a forced-rotational-synchronization transition determination time without any shifting action being executed in the automatic transmission 24 during execution of the "rotational-synchronization intermediate-stage" phase, wherein the synchronization unable state is a state in which it is predicted that the synchronization of the engine rotational speed Ne and the MG rotational speed Nm cannot be made.

The "engagement transition sweep" phase is a progress phase in which the K0 torque Tk0 is gradually increased to place the K0 clutch 20 into the engaged state. The above-described "rotational-synchronization final-stage" phase is transited to this "engagement transition sweep" phase, in a case in which a rotational-synchronization determination is made during the "rotational-synchronization final-stage" phase.

The "full-engagement transition sweep" phase is a progress phase in which the K0 torque Tk0 is gradually increased to place the K0 clutch 20 into the fully engaged state. To place the K0 clutch 20 into the fully engaged state is, for example, to increase the K0 torque Tk0 to a state in which a safety factor that can guarantee the engagement of the K0 clutch 20 is added. The above-described "engagement transition sweep" phase is transited to this "full-engagement transition sweep" phase, in a case in which a K0 engagement determination is made during the "engagement transition sweep" phase. Further, the above-described "engagement transition sweep" phase is transited to this "full-engagement transition sweep" phase, in a case in which a rotational-synchronization state of the K0 clutch cannot be maintained during the "engagement transition sweep" phase. Still further, the above-described "engagement transition sweep" phase is transited to this "full-engagement transition sweep" phase, in a case in which it is determined that a time from initiation of the "engagement transition sweep" phase exceeds a predetermined forced engagement transition determination time and that an absolute value of a K0 differential rotation ΔNk0 is not smaller than a predetermined full-engagement-transition-sweep forced-transition determination differential-rotation. The K0 differential rotation ΔNk0 is a differential rotational speed (=Nm−Ne) of the K0 clutch 20.

The "full engagement" phase is a progress phase in which the fully engaged state of the K0 clutch 20 is maintained. The above-described "full-engagement transition sweep" phase is transited to this "full engagement" phase, in a case in which a full engagement determination is made during the "full-engagement transition sweep". Further, the above-described "full-engagement transition sweep" phase is transited to this "full engagement" phase, in a case in which it is determined that a time from initiation of the "full-engagement transition sweep" phase becomes not shorter than a predetermined forced full-engagement transition determination time and that the absolute value of the K0 differential rotation ΔNk0 is not smaller than a predetermined full-engagement forced-transition determination differential-rotation.

The "backup sweep" phase is also transmitted to the "full engagement" phase. Specifically, the "backup sweep" phase is transited to the "full engagement" phase, in a case in which a full engagement determination is made and a determination that the absolute value of the K0 differential rotation ΔNk0 is not larger than a predetermined backup-stage rotational-synchronization determination differential-rotation is made consecutively at least a predetermined backup-stage rotational-synchronization determination times. Further, the "backup sweep" phase is transited to the "full engagement" phase, in a case in which it is determined that a time from a transition to a certain progress phase other than the "K0standby" phase after initiation of the engine-start control operation becomes not shorter than a predetermined engine-start-control time-out time and that the absolute value of the K0 differential rotation ΔNk0 is not smaller than the full-engagement forced-transition determination differential-rotation.

The "backup sweep" phase is a progress phase in which a backup control operation for gradually increasing the K0 torque Tk0 so as to engage the K0 clutch 20 is executed. The "backup sweep" phase is executed for preventing a control stuck, for example, during one of the above-described "K0 cranking" phase, "pre-reengaging constant-pressure standby" phase, "rotational-synchronization initial-stage" phase, "rotational-synchronization intermediate-stage" phase and "rotational-synchronization final-stage" phase. Specifically, one of the above-described progress phases is transited to this "backup sweep" phase, in a case in which it is determined that a time from initiation of the currently executed one of the progress phases exceeds a corresponding backup transition determination time (corresponding to the currently executed progress phase) and that the absolute value of the K0 differential rotation ΔNk0 is not smaller than a corresponding backup transition determination differential-rotation (corresponding to the currently executed progress phase).

The "calculation stop" phase is a progress phase in which calculations of a corrected value of the K0 hydraulic pressure PRk0 and a required K0 torque Tk0d, which are used for the engine-start control operation, are stopped during execution of a fail-safe control operation. The fail-safe control operation is a control operation that is executed, for example, in the event of a failure that disables output of the regulated K0 hydraulic pressure PRk0 from the K0-clutch solenoid valve, to switch a fluid passage in the hydraulic control unit 56 so as to supply, to the clutch actuator 120 without through the K0-clutch solenoid valve, the K0 hydraulic pressure PRk0 that makes it possible to keep the fully engaged state of the K0 clutch 20, such as a line hydraulic pressure supplied as an original hydraulic pressure. The corrected value is a pressure value obtained by correcting a base pressure value of the K0 hydraulic pressure PRk0 used in the engine-start control operation, depending on the working-fluid temperature THoil.

The required K0 torque Tk0d is the K0 torque Tk0 required for cranking the engine 12 and switching the K0 clutch 20 into the engaged state in the engine-start control operation for starting the engine 12.

The K0 control phase definitions Dphk0 is prepared for the purpose of calculating the corrected value of the K0 hydraulic pressure PRk0 and the required K0 torque Tk0d that are used for the engine-start control operation for starting the engine 12, for example. In the K0 control phase definitions Dphk0, each of the progress phases is defined based on a required state of control for the K0 clutch 20, which is required for controlling the K0 hydraulic pressure PRk0 and the K0 torque Tk0. That is, in the K0 control phase definitions Dphk0, each of the progress phases is defined based on requirements for controlling switching of the operation state of the K0 clutch 20.

The clutch control portion 94 is configured, when the engine 12 is to be started, to control the clutch actuator 120 such that the operation state of the K0 clutch 20 is switched from the released state to the engaged state via the progress phases that are defined in the K0 control phase definitions Dphk0.

The engine-start control portion 92c is configured, when the engine 12 is to be started, to control the electric motor MG and the engine 12, depending on the operation state of the K0 clutch 20. In the engine-start control operation for starting the engine 12, the electric motor MG is controlled to output the required cranking torque Tcrn, and the engine 12 is controlled to start the operation. To this end, when the engine 12 is to be started, the engine-start control portion 92c controls the electric motor MG and the engine 12, by executing required control operations of the progress phases defined in the K0 control phase definitions Dphk0. Thus, it is possible to simplify the control operations required for starting the engine 12.

Figure 4:
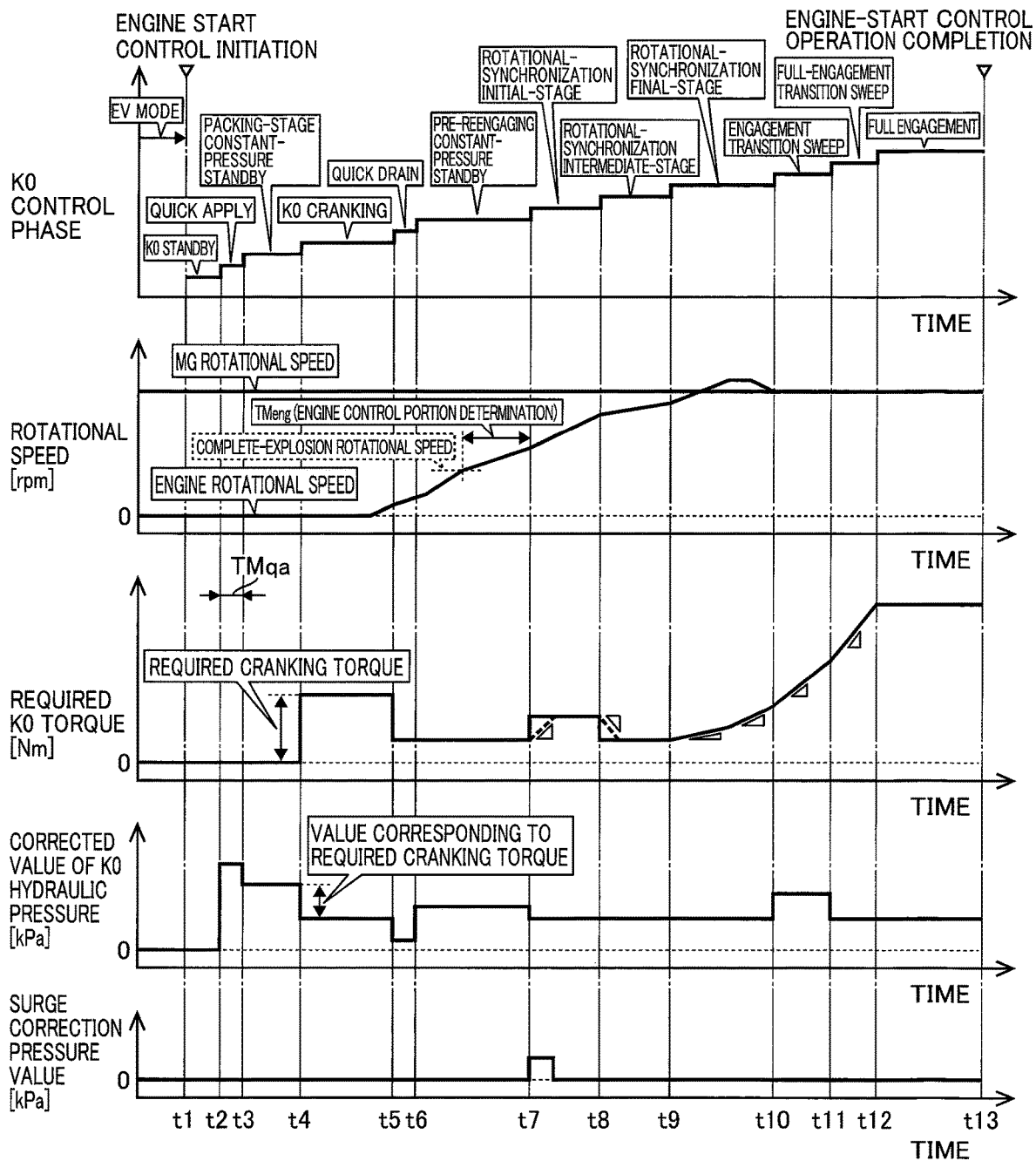
FIG. 4 is a view showing, by way of example, a time chart in a case in which an engine-start control operation is executed.

FIG. 4 is a view showing, by way of example, a time chart in a case in which the engine-start control operation is executed for starting the engine 12. In FIG. 4, "K0 CONTROL PHASE" represents transitions of the progress phases defined in the K0 control phase definitions Dphk0. The K0 hydraulic-pressure command value Spk0, which corresponds to a sum of a pressure value of the K0 hydraulic pressure PRk0 into which the required K0 torque Tk0d is converted and the corrected value of the K0 hydraulic pressure PRk0, is outputted.

In FIG. 4, a time point t1 represents a point of time at which the engine-start control operation is initiated in response to request for starting of the engine 12 during the EV running or during EV driving mode with the vehicle 10 being stopped with an idling state. After initiation of the engine-start control operation, the "K0standby" phase (see time point t0 to time point t2), the "quick apply" phase (see time point t2 to time point t3) and "packing-stage constant-pressure standby" phase (see time point t3 to time point t4) are sequentially executed. Then, following a packing control operation for packing the K0 clutch 20, the "K0 cranking" phase (see time point t4 to time point t5) is executed.

In the example shown in FIG. 4, in the "packing-stage constant-pressure standby" phase, the K0 hydraulic pressure PRk0 corresponding to the required cranking torque Tcrn required in the "K0 cranking" phase is applied to the clutch actuator 120. In the "packing-stage constant-pressure standby" phase, the actual K0 hydraulic pressure PRk0 is not increased beyond a pressure value that generates the K0 torque Tk0.

In the "K0 cranking" phase, the actual K0 hydraulic pressure PRk0 is increased beyond the pressure value that generates the K0 torque Tk0. It is noted that, in the "packing-stage constant-pressure standby" phase, the K0 hydraulic pressure PRk0, by which the K0 clutch 20 is kept in the pack-clearance-elimination completion state, may be added. In the "K0 cranking" phase, the MG torque Tm whose magnitude corresponds to the required K0 torque Tk0d, i.e., the required cranking torque Tcrn, is outputted from the electric motor MG. In the "K0 cranking" phase, when the engine rotational speed Ne is increased, the engine ignition is initiated whereby the initial combustion of the engine 12 is caused. It is noted that, in a case in which an ignition start is made, the initial combustion of the engine 12 is caused substantially concurrently with start of increase of the engine rotational speed N, for example.

After the initial combustion of engine 12, the "K0 cranking" phase is followed by the "quick drain" phase (see time point t5 to time point t6) and "pre-reengaging constant-pressure standby" phase (see time point t6 to time point t7)" that are executed to output the K0 hydraulic-pressure command value Spk0 that is temporarily low, so as not to cause disturbance to the complete explosion of the engine 12. When an engine-complete-explosion notification is outputted from the engine control portion 92a (see time point t7), the "rotational-synchronization initial-stage" phase (see time point t7 to time point t8), the "rotational-synchronization intermediate-stage" phase (see time point t8 to time point t9), the "rotational-synchronization final-stage" phase (see time point t9 to time point t10) and the "engagement transition sweep" phase (see time point t10 to time point t11) are sequentially executed whereby a rotational-synchronization control operation for the engine 12 and the electric motor MG is executed. The "engagement transition sweep" phase is followed by the "full-engagement transition sweep" phase (see time point t11 to time point t12) that is executed to gradually increase the K0 torque Tk0 to a state in which the safety factor that can guarantee the engagement of the K0 clutch 20 is added. When the K0 torque Tk0 has been increased to the state with the safety factor guaranteeing the engagement of the K0 clutch 20, the "full engagement" phase is executed (see time point t12 to time point t13) whereby the fully engaged state of the K0 clutch 20 is maintained. The time point t13 represents a point of time at which the engine-start control operation is completed. It is noted that the "engagement transition sweep" phase and the "full-engagement transition sweep" phase are indicated as "ENGAGEMENT TRANSITION SW" and "FULL-ENGAGEMENT TRANSITION SW", respectively, in FIG. 4.

Referring to the "K0 cranking" phase in FIGS. 3 and 4, the clutch control portion 94 is configured, when the engine 12 is to be started, to output, as the K0 hydraulic-pressure command value Spk0 for supplying the hydraulic pressure PRk0 to the clutch actuator 120, a cranking hydraulic-pressure command value Spk0*cr* for regulating the K0 hydraulic pressure PRk0 supplied to the clutch actuator 120 so as to cause the required cranking torque Tcrn to be transmitted through the K0 clutch 20, such that the outputted cranking hydraulic-pressure command value Spk0*cr* is supplied to the hydraulic control unit 56 in the engaging process for switching of the operation state of the K0 clutch 20 from the released state to the engaged state.

Referring to the "quick apply" phase in FIGS. 3 and 4, the clutch control portion 94 is configured, when the engine 12 is to be started, to output, as the K0 hydraulic-pressure command value Spk0, a fast-filling hydraulic-pressure command value Spk0*ff* for improving the responsiveness of the K0 hydraulic pressure PRk0 in the clutch actuator 120 so as to quickly place the K0 clutch 20 into the pack-clearance-elimination completion state, such that the outputted fast-filling hydraulic-pressure command value Spk0*ff* is supplied to the hydraulic control unit 56, prior to output of the cranking hydraulic-pressure command value Spk0*cr* in the "K0 cranking" phase. The quick apply in the "quick apply" phase is a fast or quick filling for quickly filling the fluid chamber 116 of the clutch actuator 120 with the working fluid OIL. Thus, in the description regarding the present embodiment, the K0 hydraulic-pressure command value Spk0 for the fast or quick filling is referred to as the "fast-filling hydraulic-pressure command value Spk0*ff*".

Meanwhile, the K0 hydraulic pressure PRk0 and the K0 torque Tk0 could vary relative to the K0 hydraulic-pressure command value Spk0, due to various factors. Therefore, there is a risk that each of the engine rotational speed Ne and the MG rotational speed Nm would be deviated from its target speed value in the engaging process of the K0 clutch 20 in the engine-start control operation for starting the engine 12. To this end, it is desirable to execute at least one learning operation related to the engagement of the K0 clutch 20 upon the starting of the engine 12, wherein the learning operation is executed to correct a relationship representing a correlation between the K0 hydraulic pressure PRk0 and the K0 hydraulic-pressure command value Spk0, for example.

For performing a control operation for enabling the engagement of the K0 clutch 20 to be appropriately controlled upon the starting of the engine 12, the electronic control apparatus 90 further includes a learning control means in the form of a learning control portion 98.

The learning control portion 98 is configured to execute the at least one learning operation in the form of a plurality of kinds of learning controls for correcting the relationship representing the correlation between the K0 hydraulic pressure PRk0 and the K0 hydraulic-pressure command value Spk0 in the engaging process of the K0 clutch 20 upon the starting of the engine 12. The relationship representing the correlation between the K0 hydraulic pressure PRk0 and the K0 hydraulic-pressure command value Spk0 is, for example, a correlationship between an actual K0 hydraulic pressure Spk0 (that is an actual value of the K0 hydraulic pressure PRk0) and the K0 hydraulic-pressure command value Spk0, a correlationship between the actual K0 hydraulic pressure Spk0 and the required K0 torque Tk0d, a correlationship between an actual K0 torque Tk0r (that is an actual value of the K0 torque Tk0) and the K0 hydraulic-pressure command value Spk0, or a correlationship between the actual K0 torque Tk0r and the required K0 torque Tk0d. The learning control for correcting the relationship representing the correlation between the K0 hydraulic pressure PRk0 and the K0 hydraulic-pressure command value Spk0 is, for example, a learning control for correcting variation of the actual K0 hydraulic pressure PRk0 relative to the K0 hydraulic-pressure command value Spk0. From another point of view, the learning control for correcting the relationship representing the correlation between the K0 hydraulic pressure PRk0 and the K0 hydraulic-pressure command value Spk0 is a learning operation for collecting variation of the K0 hydraulic-pressure command value Spk for making the actual K0 torque Tk0r equal to the required K0 torque Tk0d. In the description regarding the present embodiment, the learning control will be referred to as "K0 learning control CTlrnk0". It is noted that, in the description regarding the present embodiment, for example, the K0 hydraulic pressure PRk0 and the K0 torque Tk0 represent respective actual values, unless otherwise specified. Further, the variation of the K0 hydraulic pressure PRk0 and the variation of the K0 torque Tk0 correspond to each other.

Each of the plurality of kinds of K0 learning controls CTlrnk0 is executed in a corresponding one of the progress phases that are switched in the engaging process of the K0 clutch 20. The plurality of kinds of K0 learning controls CTlrnk0 include a learning control that is to be executed for correcting a quick apply time (=QA time) TMqa that is a period of time for which the quick apply is executed in the "quick apply" phase before generation of the K0 torque Tk0, namely, a fast-filling-time learning that is to be executed for correcting a QA time TMqa (fast filling time) that is a period of time for which the fast-filling hydraulic-pressure command value Spk0*ff* is outputted for improving the responsiveness of the K0 hydraulic pressure PRk0 of the clutch actuator 120 relative to the K0 hydraulic-pressure command value Spk0 so as to quickly place the K0 clutch 20 into the pack-clearance-elimination completion state. The fast filling time is synonymous with the QA time TMqa. In the following description regarding the present embodiment, the fast-filling-time learning will be referred to as "QA time learning CTlrnqa".

Further, the plurality of kinds of K0 learning controls CTlrnk0 include a learning control that is to be executed for correcting the packing-end pressure PRk0pk that is the K0 hydraulic pressure PRk0 of a constant-pressure standby stage in the "packing-stage constant-pressure standby" phase shortly before generation of the K0 torque Tk0, namely, a contact-point learning CTlrnpk as a packing completion hydraulic-pressure learning that is to be executed to correct the packing-end pressure PRk0pk that is the K0 hydraulic pressure PRk0 for placing the K0 clutch 20 into the pack-clearance-elimination completion state.

It is noted that, in the present embodiment, in the "packing-stage constant-pressure standby" phase, one of the cranking hydraulic-pressure command value Spk0*cr* and the packing hydraulic-pressure command value Spk0*pk* is selected depending on a situation of the vehicle 10, and is outputted to the hydraulic control unit 56. The packing hydraulic-pressure command value Spk0*pk* is the K0 hydraulic-pressure command value Spk0 for regulating the K0 hydraulic pressure PRk0 supplied to the clutch actuator 120 so as to maintain the pack-clearance-elimination completion state of the K0 clutch 20, i.e., so as to keep the K0 hydraulic pressure PRk0 to be the packing-end pressure PRk0pk, prior to output of the cranking hydraulic-pressure command value Spk0*cr* in the "K0 cranking" phase upon the starting of the engine 12. The contact-point learning CTlrnpk can be executed in a case in which the packing hydraulic-pressure command value Spk0pk is outputted in the "packing-stage constant-pressure standby" phase, and is not executed in a case in which the cranking hydraulic-pressure command value Spk0*cr* is outputted. The packing hydraulic-pressure command value Spk0*pk* is outputted, for example, when the vehicle 10 is in a state in which the vehicle driver hardly feels uncomfortable even if the engine start is delayed or in a state in which the engine start shock is likely to occur. The state in which the vehicle driver hardly feels uncomfortable even if the engine start is delayed is, for example, when the starting of the engine 12 is required even without operation of the vehicle driver, such as a case in which the engine 12 or other component needs to be warmed up. The state in which the engine start shock is likely to occur is, for example, when the engine 12 is started by cooperation with another control operation other than the engine-start control operation for starting the engine 12, such as a case in which the engine 12 is started by cooperation with a shift control operation of the automatic transmission 24.

The cranking hydraulic-pressure command value Spk0*cr* is outputted, for example, when the vehicle 10 is in a state in which the vehicle driver is likely to feel uncomfortable if the engine start is delayed or in a state in which the engine start shock is unlikely to occur. The state in which the vehicle driver is likely to feel uncomfortable if the engine start is delayed is, for example, when the starting of the engine 12 is requested by increase of the requested drive amount of the vehicle 10 that is requested by the vehicle driver. The state in which the engine start shock is unlikely to occur is, for example, when the engine 12 is started without cooperation with another control operation other than the engine-start control operation for starting the engine 12. The "packing-stage constant-pressure standby" phase is transited to the "K0 cranking" phase, in a case in which it is determined that the packing of the K0 clutch 20 has been completed as a predetermined constant-pressure standby continuation time has elapsed from initiation of the "packing-stage constant-pressure standby" phase. The constant-pressure standby continuation time is basically set to a value longer in the state in which the packing hydraulic-pressure command value Spk0*pk* is outputted, than in the state in which the cranking hydraulic-pressure command value Spk0*cr* is outputted.

Further, the plurality of kinds of K0 learning controls CTlrnk0 include a learning control that is to be executed for correcting a difference between a timing of start of increase of the K0 torque Tk0 and a timing of start of increase of the MG torque Tm as the K0 reaction compensation torque in the "K0 cranking" phase after the "packing-stage constant-pressure standby" phase, namely, an increase-start timing learning that is to be executed for correcting a difference between a transmission-torque increase-start time point and an electric-motor-torque increase-start time point, wherein the transmission-torque increase-start time point is a point of time at which the K0 torque Tk0 starts to be increased toward the required cranking torque Tcrn, and the electric-motor-torque increase-start time point is a point of time at which the MG torque Tm starts to be increased by a magnitude corresponding to the required cranking torque Tcrn. This increase-start timing learning serves also as a dead-time learning CTlrntm that is to be executed for correcting a dead time TMwt from a point of time of initiation of the "K0 cranking" phase to a point of time at which the K0 torque Tk0 starts to be increased in response to the cranking hydraulic-pressure command value Spk0*cr*.

Further, the plurality of kinds of K0 learning controls CTlrnk0 include a learning control that is to be executed for correcting a variation of the K0 torque Tk0 relative to the cranking hydraulic-pressure command value Spk0*cr* in the "K0 cranking" phase after start of generation of the K0 torque Tk0, namely, a transmission-torque learning CTlrntk that is to be executed for correcting a deviation of the K0 torque Tk0 generated based on the cranking hydraulic-pressure command value Spk0*cr*, from the required cranking torque Tcrn.

The learning control portion 98 is configured to obtain learning parameters PAlrn for executing the plurality of kinds of K0 learning controls CTlrnk0, as needed, and to execute the K0 learning controls CTlrnko by which learning values VALlrn are calculated based on the obtained learning parameters PAlrn so as to be updated. Each of the learning parameters PAlrn is a value representing, for example, a phenomenon caused when a corresponding one of the learning value VALlrn calculated in a corresponding one of the K0 learning controls CTlrnk0 is not converged. The learning value VALlrn in the QA time learning CTlrnqa is, for example, a correction value of the QA time TMqa. The learning value VALlrn in the contact-point learning CTlrnpk is, for example, a correction value of the packing-end pressure PRk0pk. The learning value VALlrn in the dead-time learning CTlrntm is, for example, a correction value of the dead time TMwt. The learning value VALlrn in the transmission-torque learning CTlrntk is, for example, the K0 torque Tk0 generated based on cranking hydraulic-pressure command value Spk0*cr*, or a correction value of the cranking hydraulic-pressure command value Spk0*cr* for making the K0 torque Tk0 equal to the required cranking torque Tcrn.

In the "quick apply" phase and "packing-stage constant-pressure standby" in which the K0 torque Tk0 should not be generated yet, the K0 torque Tk0 could be erroneously generated due to overshoot of the K0 hydraulic pressure PRk0. Further, in the "K0 cranking" phase, the magnitude or generation timing of the K0 torque Tk0 could be deviated from its target value or timing. These variations of the K0 hydraulic pressure PRk0 and the K0 torque Tk0, which result from the unconverged state of the learning value VALlrn, cause fluctuation of the MG rotational speed Nm such as its racing and dropping, for example. For example, when the K0 torque Tk0 is smaller than the target value, or when the generation timing of K0 torque Tk is delayed relative to the target timing, the MG torque Tm transmitted to the engine 12 is made smaller than targeted and the MG torque Tm not transmitted to the engine 12 is made larger than targeted. Thus, in this case, the MG rotational speed Nm is raced by surplus of the MG torque Tm that is not transmitted to the engine 12, whereby the variation of the K0 torque Tk0 results in the racing amount of the MG rotational speed Nm. The racing amount of the MG rotational speed Nm is represented by a positive value of an MG-rotationalspeed deviation amount $\Delta Nm$ (=Nm−Nmtgt) that is variation or deviation amount of the MG rotational speed Nm, wherein "Nmtgt" represents a target MG rotational speed, i.e, a target rotational speed of the MG rotational speed Nm. On the other hand, in a case in which the K0 torque Tk0 is generated in a progress phase in which the K0 torque Tk0 should not be generated yet, in a case in which the K0 torque Tk0 is larger than its target value, or in a case in which the generation timing of the K0 torque Tk0 is earlier than targeted, a part of the MG torque Tm for the drive torque Tr is transmitted to the engine 12 whereby the MG torque Tm is made smaller than targeted, namely, the MG torque Tm for the drive torque Tr is made insufficient, so that the MG rotational speed Nm is dropped and variation of the K0 torque Tk0 results in a drop amount of the MG rotational speed Nm. The drop amount of the MG rotational speed Nm is represented by a negative value of the MG-rotational-speed deviation amount $\Delta Nm$. Thus, the MG-rotational-speed deviation amount $\Delta Nm$ varies depending on a condition of the K0 clutch 20, and the MG-rotational-speed deviation amount $\Delta Nm$ is an example of the learning parameter PAlrn.

There is a case in which an MG feedback control CTfbm is executed to compensate excess or deficiency of the MG torque Tm by a feedback control such that the MG rotational speed Nm is kept to be a target MG rotational speed Nmtgt. In the case in which the MG feedback control CTfbm is executed, the variation of the K0 torque Tk0 is expressed by, for example, an MG torque deviation amount $\Delta Tm$ (=Tmfb−Tmb) that is a deviation amount of an MG torque Tmfb after the compensation made by the MG feedback control CTfbm, wherein "Tmb" represents a basic MG torque when the MG rotational speed Nm is not deviated from the target MG rotational speed Nmtgt. Thus, since the MG torque deviation amount $\Delta Tm$ could vary depending on a condition of the K0 clutch 20, the MG torque deviation amount $\Delta Tm$ is also an example of the learning parameter PAlrn. It is noted that the learning parameter PALlrn can be obtained, for example, as an integrated value or a maximum value of the deviation amount (MG-rotational-speed deviation amount $\Delta Nm$, MG torque deviation amount $\Delta Tm$) during the learning period.

For example, when the QA time learning CTlrnqa is executed, the learning parameter PAlrn corresponding to the MG-rotational-speed deviation amount $\Delta Nm$ or the MG torque deviation amount $\Delta Tm$ of the electric motor MG during the learning period from initiation of the "quick apply" phase until the predetermined time $\alpha$ elapses from end of the "quick apply" phase, is obtained. That is, the learning control portion 98 obtains the learning parameter PALlrn in the period from a point of time at which the fast-filling hydraulic-pressure command value Spk0ff is outputted, to a point of time at which the predetermined time $\alpha$ elapses from completion of the output of the fast-filling hydraulic-pressure command value Spk0ff. The predetermined time $\alpha$ is a value determined by taking account of, for example, a delay of communication between the solenoid driver of the electronic control apparatus 90 and the K0-clutch solenoid valve and a delay of response due to characteristics of the K0-clutch solenoid valve. Thus, in the QA time learning CTlrnqa, the learning parameter PALlrn is obtained, namely, the learning of the QA time TMqa is made, during the period until the predetermined time a elapses from the end point of the "quick apply" phase, so that the learning parameter PALlrn can be appropriately obtained for calculating the QA time TMqa even in presence of the communication delay and the response delay. It is noted that the predetermined time $\alpha$ is changed, as needed, depending on, preferably, the working-fluid temperature THoil. Specifically, the predetermined time a is increased with reduction of the working-fluid temperature THoil, since the responsiveness of the hydraulic pressure is reduced with reduction of the working-fluid temperature THoil.

Further, the learning control portion 98 calculates the learning value VALlrn, by performing a gain processing on the learning parameter PAlrn corresponding to the MG-rotational-speed deviation amount $\Delta Nm$ or the MG torque deviation amount $\Delta Tm$ that are obtained in the learning period of the QA time learning CTlrnqa. A gain G in the gain processing is determined based on, for example, the working-fluid temperature THoil, and the MG-rotational-speed deviation amount $\Delta Nm$ or the MG torque deviation amount $\Delta Tm$, which are obtained in the learning period of the QA time learning CTlrnqa, is multiplied by the gain G (G×$\Delta Nm$, G×$\Delta Tm$), whereby the learning value VALlrn in the QA time learning CTlrnqa is calculated. Further, in each of the contact-point learning CTlrnpk, transmission-torque learning CTlrntk and dead-time learning CTlrntm, too, the gain processing is performed on the MG-rotational-speed deviation amount $\Delta Nm$ or MG torque deviation amount $\Delta Tm$ that are obtained in the corresponding learning period, whereby the learning value VALlrn in the contact-point learning CTlrnpk, transmission-torque learning CTlrntk or dead-time learning CTlrntm is calculated. Then, with the learning value VAL being updated (corrected) to the new learning value VALlrn, in the next engagement of the K0 clutch 20, the K0 hydraulic-pressure command value Spk0 is corrected by adding or subtracting the new learning value VALlrn (obtained in each K0 learning control CTlrnk0) to or from a base pressure value of the K0 hydraulic-pressure command value Spk0.

Further, the learning value VALlrn may be calculated by an offset processing in place of the above-described gain processing. The offset processing is executed to obtain the learning value VALlrn of each K0 learning control CTlrnko, based on the learning parameter PALIrn (corresponding to the MG-rotational-speed deviation amount $\Delta Nm$ or MG torque deviation amount $\Delta Tm$ obtained in the corresponding learning period) and also an offset amount M. Then, with the learning value VAL being updated (corrected) to the new learning value VALlrn, in the next engagement of the K0 clutch 20, the K0 hydraulic-pressure command value Spk0 is corrected by adding or subtracting the new learning value VALlrn (obtained in each K0 learning control CTlrnk0) to or from the base pressure value of the K0 hydraulic-pressure command value Spk0. Consequently, with the learning value VALlrn being updated, the relationship representing the correlation between the K0 hydraulic pressure PRk0 and the K0 hydraulic-pressure command value Spk0 is corrected.

It is noted that the calculation of the learning value VALlrn, which is made by performing the gain or offset processing on the learning parameter PALlrn, is not executed in a case in which the "backup sweep" phase is established in the engaging process of the K0 clutch 20 and the K0 torque Tk0 is gradually increased by the backup control operation, or in a case in which "calculation stop" phase is established in the engaging process of the K0 clutch 20.

By the way, in the control in which the K0 clutch 20 is switched to the engaged state in the process of the starting of the engine 12, the "quick apply" phase is first executed to generate the K0 hydraulic pressure PRk0, so that the change of the QA time TMqa by the QA time learning CTlrnqa and the overshoot of the K0 hydraulic pressure PRk0 due to the unconvergence of the QA time TMqa could affect a characteristic of the packing-end pressure PRk0pk, for example. Further, if the packing-end pressure PRk0pk is not converged, for example, the K0 hydraulic pressure PRk0 corresponding to a zero point of the K0 torque Tk0 could be fluctuated whereby the correlationship between the cranking hydraulic-pressure command value Spk0cr and the K0 torque Tk0 could be affected. Still further, if the learning value VALlrn in the transmission-torque learning CTlrntk is not converged, for example, the cranking hydraulic-pressure command value Spk0cr could be fluctuated whereby a response characteristics of K0 torque Tk0, i.e., the dead time TMwt, could be affected. Therefore, depending on an execution order of each one of the plurality of kinds of K0 learning controls CTlrnk0, for example, there could be a case in which, after the dead time TMwt is once converged by the dead-time learning CTlrntm, the dead time TMwt could be unconverged again if the QA time TMqa is changed by the QA time learning CTlrnqa, so that the progress of the K0 learning controls CTlrnk0 related to the engagement of K0 clutch 20 upon the starting of the engine 12 could be delayed.

Therefore, a priority for executing each one of the plurality of kinds of K0 learning controls CTlrnk0 is predetermined such that the variation of the learning value VALlrn in one of the K0 learning controls CTlrnk0 does not affect another one or ones of the K0 learning controls CTlrnk0 so that the another one or ones of the K0 learning controls CTlrnk0 do not provide erroneous learning results. Further, the plurality of kinds of K0 learning controls CTlrnk0 are progressed such that the learning value VALlrn in one of the K0 learning controls CTlrnk0 having a higher priority is intended to be converged earlier than the learning value VALlrn in one of the K0 learning controls CTlrnk0 having a lower priority. Considering that the change of the QA time TMqa could affect the characteristic of the packing-end pressure PRk0pk, as described above, for example, the QA time learning CTlrnqa is given the highest priority in order of the execution. The learning value VALlrn is intended to be converged sequentially in order of the QA time learning CTlrnqa, contact-point learning CTlrnpk, transmission-torque learning CTlrntk, dead-time learning CTlrntm. That is, the convergence of the learning value VALlrn is intended in an priority order in the plurality of kinds of K0 learning controls CTlrnk0. The priority order of each one of the K0 learning controls CTlrnk0 is determined depending on, for example, an order of a corresponding one of the progress phases that are switched in the engaging process of the K0 clutch 20 and/or the operation state of the K0 clutch 20 in the engaging process. In the present embodiment, where the QA time learning CTlrnqa is interpreted to correspond to "higher priority learning (to which a higher priority is given)" recited in the appended claims, each of the contact-point learning CTlrnpk, transmission-torque learning CTlrntk and dead-time learning CTlrntm is interpreted to correspond to "lower priority learning (to which a lower priority is given than to the higher priority learning)" recited in the appended claims. Where each of the QA time learning CTlrnqa and contact-point learning CTlrnpk is interpreted to correspond to the recited "higher priority learning", each of the transmission-torque learning CTlrntk and dead-time learning CTlrntm is interpreted to correspond to the recited "lower priority learning". Where each of the QA time learning CTlrnqa, contact-point learning CTlrnpk and transmission-torque learning CTlrntk is interpreted to correspond to the recited "higher priority learning", the dead-time learning CTlrntm is interpreted to correspond to the recited "lower priority learning". The terms "higher priority learning" and "lower priority" will be used also in the following description where appropriate.

The priority order in terms of the convergence of the learning value VALlrn should not be interpreted to exclude a case in which two or more of the K0 learning controls CTlrnk0 are executed in the starting of the engine 12 at one engine start in the engagement control of K0 clutch 20 accompanying the starting of the engine 12. Rather, irrespective of whether the learning value VALlrn in the higher priority learning has been converged or not, the lower priority learning is executed. That is, the lower priority learning is executed when the learning value VALlrn in the higher priority learning has not yet been converged as well as when the learning value VALlrn in the higher priority learning has been converged. However, due to the priority order in terms of the convergence of the learning value VALlrn, as long as the learning value VALlrn in the higher priority learning has not yet been converged, it is regarded that the learning value VALlrn in the lower priority learning has not yet been converged, either.

As described above, in a state in which the learning value VALlrn in the higher priority learning has not yet been converged, if the lower priority learning is executed, the lower priority learning could provide an erroneous learning result. Therefore, for avoiding such an erroneous execution of the lower priority learning, it might be desirable that the lower priority learning is executed after the learning value VALlrn in the higher priority learning has been converged. However, if the convergence of the learning value VALlrn in the higher priority learning is awaited, the progress of the lower priority learning could be hard. However, the progress of the lower priority learning is not impeded in the present embodiment in which the lower priority learning is executed irrespective of whether the learning value VALlrn in the higher priority learning has been converged or not.

In execution of the engagement control of K0 clutch 20 accompanying the starting of the engine 12, the learning control portion 98 executes the QA time learning CTlrnqa having the highest priority in the order of the execution, earlier than the others of the K0 learning controls CTlrnk0. Further, the learning control portion 98 makes a determination as to whether the learning value VALlrn in the form of the correction value of the QA time TMqa calculated by the QA time learning CTlrnqa has been converged or not. Then, irrespective of the above determination related to the QA time learning CTlrnqa, the learning control portion 98 executes the others of the K0 learning controls CTlrnk0, i.e., the contact-point learning CTlrnpk, transmission-torque learning CTlrntk and dead-time learning CTlrntm, so as to calculate the respective learning values VALlrn, and determines whether each of the learning values VALlrn has been converged or not.

Specifically, when it is determined by the engine-start control portion 92c that the starting of the engine 12 is requested, the learning control portion 98 determines whether the K0 learning controls CTlrnk0 are to be executed in the current execution of the engine-start control operation. The learning control portion 98 determines that the K0 learning controls CTlrnk0 are to be executed, for example, when the vehicle 10 is in a stable state without the K0-clutch solenoid valve and other components being failed. In this instance, the learning control portion 98 determines whether the vehicle 10 is in the stable state or not, depending on, for example, the vehicle running speed V, accelerator opening degree θacc, gear position currently established in the automatic transmission 24 and MG rotational speed Nm. The learning control portion 98 determines that the K0 learning controls CTlrnk0 is not be executed when the vehicle 10 is not in the stable state, or when the K0-clutch solenoid valve or other components are failed.

When determining that the K0 learning controls CTlrnk0 are to be executed, the learning control portion 98 preferentially executes the QA time learning CTlrnqa that is one of the K0 learning controls CTlrnk0 having the highest priority.

The learning control portion 98 makes a determination as to whether the learning value VALlrn in the QA time learning CTlrnqa as the executed learning control CTlrnk0 has been converged or not. This determination is made, for example, depending on whether a value of the learning parameter PAlrn obtained in the QA time learning CTlrnqa as the executed K0 learning control CTlrnk0 is smaller than a predetermined deviation amount K that is determined for the determination as to whether the learning value VALlrn has been converged or not. It is noted that the predetermined deviation amount K is obtained by experimentation or determined by an appropriate design theory, and is set a value that makes it possible to determine that the learning value VALlrn has been converged when the value of the learning parameter PAlrn is smaller than the predetermined deviation amount K.

Further, even when it is determined that the learning value VALlrn in the executed K0 learning control CTlrnk0 has not yet been converged, the learning control portion 98 executes the other K0 learning controls CTlrnk0 having lower priority than the executed K0 learning control CTlrnk0. That is, irrespective of whether the learning value VALlrn in the higher priority learning has been converged or not, the plurality of kinds of K0 learning controls CTlrnk0, which are to be executed in the engaging process of the K0 clutch 20 accompanying the starting of the engine 12, are all executed.

As described above, irrespective of whether the learning value VALlrn in the higher priority learning has been converged or not, the plurality of kinds of K0 learning controls CTlrnko are all executed, so that the progress of each of the leanings related to the K0 clutch 20 is facilitated. However, this control arrangement provides a trade-off disadvantage that could increase a probability of erroneous execution of each of the leanings. In view of such a disadvantage, in the present embodiment, in a case in which it is determined that the higher priority learning is in the unconverged state, a gain S or an offset amount M, which is used in calculation of the learning value VALlrn in the lower priority learning, is made smaller than in a case in which it is determined that the higher priority learning is in the converged state. In the other words, in the case in which it is determined that the higher priority learning is in the unconverged state, a degree of reflection of the learning parameter PALlrn that corresponds to a learning result of the lower priority learning is made lower than in the case in which it is determined that the higher priority learning is in the converged state. It is noted that the K0 learning control CTlrnko (such as the higher priority learning and the lower priority learning) being in the converged state or unconverged state corresponds to the learning value VALlrn in the K0 learning control CTlrnko being in the converged state or unconverged state. It is also noted that reduction of the gain G or the offset amount M corresponds to reduction of the degree of reflection of the learning result, namely, to make the gain G or the offset amount M used in the calculation of the learning value VALlrn in the lower priority learning lower corresponds to "to make a degree of reflection of a learning result of the lower priority learning lower" recited in the appended claims.

In a case in which the higher priority learning is in the unconverged state, there is a possibility that the lower priority learning could be affected by the higher priority learning being in the unconverged state. Therefore, it is desirable that an amount of correction by the learning value VALlrn obtained in the lower priority learning is minimized. To this end, the gain G in the gain processing or the offset amount M in the offset processing is made smaller than in a case in which it is determined that the higher priority learning is in the converged state, so that the learning value VALlrn in the lower priority learning is made smaller, namely, the degree of reflection of the learning result of the lower priority learning is made smaller, than in the case in which the higher priority learning is in the converged state.

The learning control portion 98 calculates the learning value VALlrn in the form of the correction value of the QA time TMqa by performing the gain processing or offset processing on the learning parameter PALlrn obtained in the QA time learning CTlrnqa that has the highest priority in the present embodiment. It is noted, in the present embodiment, since the QA time learning CTlrnqa is given the highest priority in the order of the execution, the QA time learning CTlrnqa is not affected by the other K0 learning controls CTlrnk0, so that the gain G in the gain processing and the offset amount M in the offset processing are constant values irrespective of whether each of the other K0 learning controls CTlrnk0 is in the converged state or not. Further, the learning control portion 98 determines whether the QA time learning CTlrnqa is in the converged state or not, depending on whether a QA learning parameter PALlrnqa obtained in the QA time learning CTlrnqa is smaller than the predetermined deviation amount K or not.

Then, the learning control portion 98 calculates the learning value VALlrn in the form of the correction value of the packing-end pressure PRk0pk by performing the gain processing or offset processing on the learning parameter PALlrn obtained in the contact-point learning CTlrnpk that has the second highest priority after the QA time learning CTlrnqa having the highest priority in the present embodiment. In this instance, when performing the gain processing or offset processing, the learning control portion 98 changes the gain G in the gain processing or the offset amount M in the offset processing, depending on whether the QA time learning CTlrnqa, whose priority order is higher than the contact-point learning CTlrnpk, is determined to be in the converged state or not.

Specifically, when it is determined that the QA time learning CTlrnqa is in the unconverged state, the gain G (hereinafter referred to as "gain Gpkn") used in calculation of the learning value VALlrn in the form of the correction value of the packing-end pressure PRk0pk is made smaller than when it is determined that the QA time learning CTlrnqa is in the converged state. Alternatively, when it is determined that the QA time learning CTlrnqa is in the unconverged state, the offset amount M (hereinafter referred to as "offset amount Mpkn") used in calculation of the learning value VALlrn in the form of the correction value of the packing-end pressure PRk0pk is made smaller than when it is determined that the QA time learning CTlrnqa is in the converged state.

Figure 5:
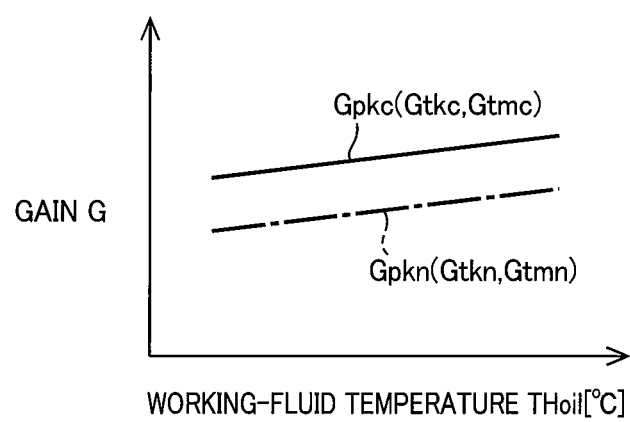
FIG. 5 is a map showing, by way of example, a relationship between a working fluid temperature and a gain used for calculation of a learning value in each of a contact-point learning, a transmission-torque learning and a dead-time learning.

The learning control portion 98 stores therein a relationship map of the gain G that is used in calculation of the learning value VALlrn in the contact-point learning CTlrnpk, and determines the gain G by applying the working-fluid temperature THoil, for example, to the this relationship map. FIG. 5 is an example of the relationship map of the gain G (gain Gpkc, Gpkn) that is used for calculating the learning value VALlrn in the contact-point learning CTlrnpk. In FIG. 5, its horizontal axis represents the working-fluid temperature THoil while its vertical axis represents the gain G. Further, in FIG. 5, a solid line indicates the gain Gpkc used when the QA time learning CTlrnqa is in the converged state, while an one-dot chain line indicates the gain Gpkn used when the QA time learning CTlrnqa is in the unconverged state. As is apparent from the relationship map shown in FIG. 5, the gain Gpkn used when the QA time learning CTlrnqa is in the unconverged state is set to a value smaller than the gain Gpkc used when the QA time learning CTlrnqa is in the converged state, so that the calculated learning value VALlrn is made smaller when the QA time learning CTlrnqa is in the unconverged state than when the QA time learning CTlrnqa is in the converged state. That is, the degree of reflection of the leaning result of the contact-point learning CTlrnpk is made smaller when the QA time learning CTlrnqa is in the unconverged state than when the QA time learning CTlrnqa is in the converged state.

Figure 6:
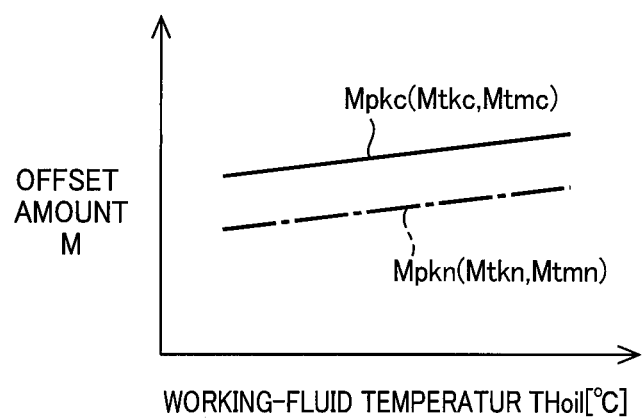
FIG. 6 is a map showing, by way of example, a relationship between the working fluid temperature and an offset amount used for calculation of the learning value in each of the contact-point learning, the transmission-torque learning and the dead-time learning.

Alternatively, the learning control portion 98 stores therein a relationship map of the offset amount M that is used in calculation of the learning value VALlrn in the contact-point learning CTlrnpk, and determines the offset amount M by applying the working-fluid temperature THoil, for example, to the this relationship map. FIG. 6 is an example of the relationship map of the offset amount M (offset amount Mpkc, Mpkn) that is used for calculating the learning value VALlrn in the contact-point learning CTlrnpk. In FIG. 6, its horizontal axis represents the working-fluid temperature THoil while its vertical axis represents the offset amount M. Further, in FIG. 6, a solid line indicates the offset amount Mpkc used when the QA time learning CTlrnqa is in the converged state, while an one-dot chain line indicates the offset amount Mpkn used when the QA time learning CTlrnqa is in the unconverged state. As is apparent from the relationship map shown in FIG. 6, the offset amount Mpkn used when the QA time learning CTlrnqa is in the unconverged state is set to a value smaller than the offset amount Mpkc used when the QA time learning CTlrnqa is in the converged state, so that the calculated learning value VALlrn is made smaller when the QA time learning CTlrnqa is in the unconverged state than when the QA time learning CTlrnqa is in the converged state. That is, the degree of reflection of the leaning result of the contact-point learning CTlrnpk is made smaller when the QA time learning CTlrnqa is in the unconverged state than when the QA time learning CTlrnqa is in the converged state.

When having calculated the learning value VALlrn in the contact-point learning CTlrnpk, the learning control portion 98 determines whether the contact-point learning CTlrnpk is in the converged state or not, depending on whether the learning parameter PALlrn obtained in the contact-point learning CTlrnpk is smaller than the predetermined deviation amount K that is determined for determining whether the learning value VALlrn in the contact-point learning CTlrnpk has been converged or not.

After having determined whether the contact-point learning CTlrnpk is in the converged state or not, the learning control portion 98 calculates the learning value VALlrn in the transmission-torque learning CTlrntk whose priority order is lower than the contact-point learning CTlrnpk. The learning control portion 98 calculates the learning value VALlrn in the form of the correction value of the cranking hydraulic-pressure command value Spk0cr, by performing the gain processing or offset processing on the learning parameter PALlrn obtained in the transmission-torque learning CTlrntk. In this instance, when performing the gain processing or offset processing, the learning control portion 98 changes the gain G in the gain processing or the offset amount M in the offset processing, depending on whether each of the QA time learning CTlrnqa and contact-point learning CTlrnpk having the priority order higher than the transmission-torque learning CTlrntk, is in the converged state or not.

Specifically, when it is determined that at least one of the QA time learning CTlrnqa and the contact-point learning CTlrnpk is in the unconverged state, the gain G (hereinafter referred to as "gain Gtkn") used in calculation of the learning value VALlrn in the form of the correction value of the cranking hydraulic-pressure command value Spk0cr is made smaller than when it is determined that both of the QA time learning CTlrnqa and the contact-point learning CTlrnpk are in the respective converged states. Alternatively, when it is determined that at least one of the QA time learning CTlrnqa and the contact-point learning CTlrnpk is in the unconverged state, the offset amount M (hereinafter referred to as "offset amount Mtkn") used in calculation of the learning value VALlrn in the form of the correction value of the cranking hydraulic-pressure command value Spk0cr is made smaller than when it is determined that both of the QA time learning CTlrnqa and the contact-point learning CTlrnpk are in the respective converged states.

The learning control portion 98 stores therein a relationship map of the gain G that is used in calculation of the learning value VALlrn in the transmission-torque learning CTlrntk, and determines the gain G by applying the working-fluid temperature THoil, for example, to the this relationship map. In the relationship of the gain G that is used in the calculation of the learning value VALlrn in the transmission-torque learning CTlrntk, too, there is substantially the same tendency as in the relationship map shown in FIG. 5. That is, the gain Gtkn used when the QA time learning CTlrnqa and/or the contact-point learning CTlrnpk is in the unconverged state is set to a value smaller than the gain Gtkc used when the QA time learning CTlrnqa and the contact-point learning CTlrnpk are both in the converged states, so that the calculated learning value VALlrn is made smaller when the QA time learning CTlrnqa and/or the contact-point learning CTlrnpk is in the unconverged state than when the QA time learning CTrnqa and the contact-point learning CTlrnpk are both in the converged states. That is, the degree of reflection of the leaning result of the transmission-torque learning CTlrntk is made smaller when the QA time learning CTlrnqa and/or the contact-point learning CTlrnpk is in the unconverged state than when the QA time learning CTlrnqa and the contact-point learning CTlrnpk are both in the converged states.

Alternatively, the learning control portion 98 stores therein a relationship map of the offset amount M that is used in calculation of the learning value VALlrn in the transmission-torque learning CTlrntk, and determines the offset amount M by applying the working-fluid temperature THoil, for example, to the this relationship map. In the relationship of the offset amount M that is used in the calculation of the learning value VALlrn in the transmission-torque learning CTlrntk, too, there is substantially the same tendency as in the relationship map shown in FIG. 6. That is, the offset amount Mtkn used when the QA time learning CTlrnqa and/or the contact-point learning CTlrnpk is in the unconverged state is set to a value smaller than the offset amount Mtkc used when the QA time learning CTlrnqa and the contact-point learning CTlrnpk are both in the converged states, so that the calculated learning value VALlrn is made smaller when the QA time learning CTlrnqa and/or the contact-point learning CTlrnpk is in the unconverged state than when the QA time learning CTlrnqa and the contact-point learning CTlrnpk are both in the converged states. That is, the degree of reflection of the leaning result of the transmission-torque learning CTlrntk is made smaller when the QA time learning CTlrnqa and/or the contact-point learning CTlrnpk is in the unconverged state than when the QA time learning CTlrnqa and the contact-point learning CTlrnpk are both in the converged states.

When having calculated the learning value VALlrn in the transmission-torque learning CTlrntk, the learning control portion 98 determines whether the transmission-torque learning CTlrntk is in the converged state or not, depending on whether the learning parameter PALlrn obtained in the transmission-torque learning CTlrntk is smaller than the predetermined deviation amount K that is determined for determining whether the learning value VALlrn in the transmission-torque learning CTlrntk has been converged or not.

After having determined whether the transmission-torque learning CTlrntk is in the converged state or not, the learning control portion 98 calculates the learning value VALlrn in the dead-time learning CTlrntm whose priority order is lower than the transmission-torque learning CTlrntk. The learning control portion 98 calculates the learning value VALlrn in the form of the correction value of the dead time TMw, by performing the gain processing or offset processing on the learning parameter PALlrn obtained in the dead-time learning CTlrntm. In this instance, when performing the gain processing or offset processing, the learning control portion 98 changes the gain G in the gain processing or the offset amount M in the offset processing, depending on whether each of the QA time learning CTlrnqa, transmission-torque learning CTlrntk and transmission-torque learning CTlrntk having the priority order higher than the dead-time learning CTlrntm, is in the converged state or not.

Specifically, when it is determined that at least one of the QA time learning CTlrnqa, contact-point learning CTlrnpk and transmission-torque learning CTlrntk is in the unconverged state, the gain G (hereinafter referred to as "gain Gtmn") used in calculation of the learning value VALlrn in the form of the correction value of the dead time TMwt is made smaller than when it is determined that all of the QA time learning CTlrnqa, contact-point learning CTlrnpk and transmission-torque learning CTlrntk are in the respective converged states. Alternatively, when it is determined that at least one of the QA time learning CTlrnqa, contact-point learning CTlrnpk and transmission-torque learning CTlrntk is in the unconverged state, the offset amount M (hereinafter referred to as "offset amount Mtmn") used in calculation of the learning value VALlrn in the form of the correction value of the dead time TMwt is made smaller than when it is determined that all of the QA time learning CTlrnqa, contact-point learning CTlrnpk and transmission-torque learning CTlrntk are in the respective converged states.

The learning control portion 98 stores therein a relationship map of the gain G that is used in calculation of the learning value VALlrn in the dead-time learning CTlrntm, and determines the gain G by applying the working-fluid temperature THoil, for example, to the this relationship map. In the relationship of the gain G that is used in the calculation of the learning value VALlrn in the dead-time learning CTlrntm, too, there is substantially the same tendency as in the relationship map shown in FIG. 5. That is, the gain Gtmn used when the QA time learning CTlrnqa, contact-point learning CTlrnpk and/or transmission-torque learning CTlrntk is in the unconverged state is set to a value smaller than the gain Gtmc used when the QA time learning CTlrnqa, contact-point learning CTlrnpk and transmission-torque learning CTlrntk are all in the converged states, so that the calculated learning value VALlrn is made smaller when the QA time learning CTlrnqa, contact-point learning CTlrnpk and/or transmission-torque learning CTlrntk is in the unconverged state than when the QA time learning CTlrnqa, contact-point learning CTlrnpk and transmission-torque learning CTlrntk are all in the converged states. In other words, the degree of reflection of the leaning result of the dead-time learning CTlrntm is made smaller when the QA time learning CTlrnqa, contact-point learning CTlrnpk and/or transmission-torque learning CTlrntk is in the unconverged state than when the QA time learning CTlrnqa, contact-point learning CTlrnpk and transmission-torque learning CTlrntk are all in the converged states.

Alternatively, the learning control portion 98 stores therein a relationship map of the offset amount M that is used in calculation of the learning value VALlrn in the dead-time learning CTlrntm, and determines the offset amount M by applying the working-fluid temperature THoil, for example, to the this relationship map. In the relationship of the offset amount M that is used in the calculation of the learning value VALlrn in the dead-time learning CTlrntm, too, there is substantially the same tendency as in the relationship map shown in FIG. 6. That is, the offset amount Mtmn used when the QA time learning CTlrnqa, contact-point learning CTlrnpk and/or transmission-torque learning CTlrntk is in the unconverged state is set to a value smaller than the offset amount Mtmc used when the QA time learning CTlrnqa, contact-point learning CTlrnpk and transmission-torque learning CTlrntk are all in the converged states, so that the calculated learning value VALlrn is made smaller when the QA time learning CTlrnqa, contact-point learning CTlrnpk and/or transmission-torque learning CTlrntk is in the unconverged state than when the QA time learning CTlrnqa, contact-point learning CTlrnpk and transmission-torque learning CTlrntk are all in the converged states. In other words, the degree of reflection of the leaning result of the dead-time learning CTlrntm is made smaller when the QA time learning CTlrnqa, contact-point learning CTlrnpk and/or transmission-torque learning CTlrntk is in the unconverged state than when the QA time learning CTlrnqa, contact-point learning CTlrnpk and transmission-torque learning CTlrntk are all in the converged states.

When having calculated the learning value VALlrn in the dead-time learning CTlrntm, the learning control portion 98 determines whether the dead-time learning CTlrntm is in the converged state or not, depending on whether the learning parameter PALlrn obtained in the dead-time learning CTlrntm is smaller than the predetermined deviation amount K that is determined for determining whether the learning value VALlrn in the dead-time learning CTlrntm has been converged or not.

Then, when each learning value VALlrn is to be updated (changed) to a value that is calculated by a corresponding one of the plurality of kinds of K0 learning controls CTlrnk0, the learning control portion 98 determines whether the vehicle 10 is in a state in which the update of the learning value VALlrn is possible or not. Specifically, when each learning value VALlrn is to be updated, the learning control portion 98 determines whether the vehicle 10 is in the state in which the update of each learning value VALlrn is possible or not, depending on whether one of first and second conditions is satisfied or not, after the starting of the engine 12 with executions of the K0 learning controls CTlrnk0 has been completed. The first condition is that the K0 hydraulic pressure PRk0 supplied to the clutch actuator 120 is not higher than a predetermined value β that is close to zero, and the second condition is that the K0 hydraulic-pressure command value Spk0 is not being outputted to the hydraulic control unit 56 (namely, the K0 hydraulic-pressure command value Spk0 is zero). When determining that one of the first and second conditions is satisfied, the learning control portion 98 executes update of each of the learning values VALlrn, namely, executes update of the relationship representing the correlation between the K0 hydraulic pressure PRk0 and the K0 hydraulic-pressure command value Spk0. When the above-described first condition or second condition is satisfied, the hydraulic control of the K0 clutch 20 is not executed so that a load applied to the electronic control apparatus 90 is small thereby enabling an appropriate execution of the update of each of the learning values VALlrn, which increases the load applied to the electronic control apparatus 90. That is, the update of each of the learning values VALlrn is not executed concurrently with execution of the hydraulic control of the K0 clutch 20 by the electronic control apparatus 90, so that the hydraulic control of the K0 clutch 20 can be avoided from being affected by execution of the update of each learning value VALlrn.

When determining that the vehicle 10 is in the state in which the update of each learning object is possible, the learning control portion 98 executes the update of the learning value VALlrn in the QA time learning CTlrnqa having the highest priority in the order of the execution, and then executes the update of each of the learning values VALlrn in the other K0 learning controls CTlrnk0. Specifically, the learning control portion 98 replaces each learning value VALlrn that has been stored in, for example, the ROM of the electronic control apparatus 90, by the new learning value VALlrn that is newly obtained in the latest execution of the corresponding K0 learning control CTlrnk0.

In this instance, in a case in which it is determined that the learning value VALlrn in the higher priority learning is in the unconverged state, namely, the higher priority learning is in the unconverged state, a reliability of the learning value VALlrn obtained in the lower priority learning is low. In the present embodiment, in such a case in which it is determined that the higher priority learning is in the unconverged state, when the learning parameter PALlrn (representing the deviation amount) obtained in the lower priority learning exceeds a predetermined range Rp, the learning control portion 98 updates the learning value VALlrn, so as to reflect the learning result of the lower priority learning on the relationship representing the correlation between the K0 hydraulic pressure PRk0 and the K0 hydraulic-pressure command value Spk0. When the learning parameter PALlrn representing the deviation amount is large, the variation of the hydraulic pressure is large and accordingly a command value (e.g., K0 hydraulic-pressure command value Spk0) is largely deviated from a target value (e.g., target value of the K0 torque Tk0), so that the reliability of the learning value VALlrn before the update is considered to be low. In such an event, even in the case in which the higher priority learning is in the unconverged state, the learning value VALlrn is updated whereby the variation of the hydraulic pressure is reduced and the progress of the K0 learning controls CTlrnk0 is avoided from being impeded. Further, since the gain G or offset amount M is reduced in the case in which the higher priority learning is in the unconverged state, influence of the erroneous execution of the lower priority learning can be suppressed. It is noted that the predetermined range Rp, which is a pre-stored value, is obtained by experimentation or determined by an appropriate design theory, and is set to, for example, a lower threshold value of a range in which the deviation of the command value as the learning object from the target value is considerably large. Further, the predetermined range Rp is changed, as needed, depending on the learning object of each of the K0 learning controls CTlrnko. On the other hand, in the case in which the higher priority learning is in the unconverged state without the learning parameter PALlrn in the lower priority learning exceeding the predetermined range Rp, the learning value VALlrn in the lower priority learning is not updated so that it is possible to reduce a number of times of influence from the erroneously executed learning, wherein the influence could be caused by the update of the learning value VALlrn in the lower priority learning even in the unconverged state of the upper priority learning.

Figure 7:
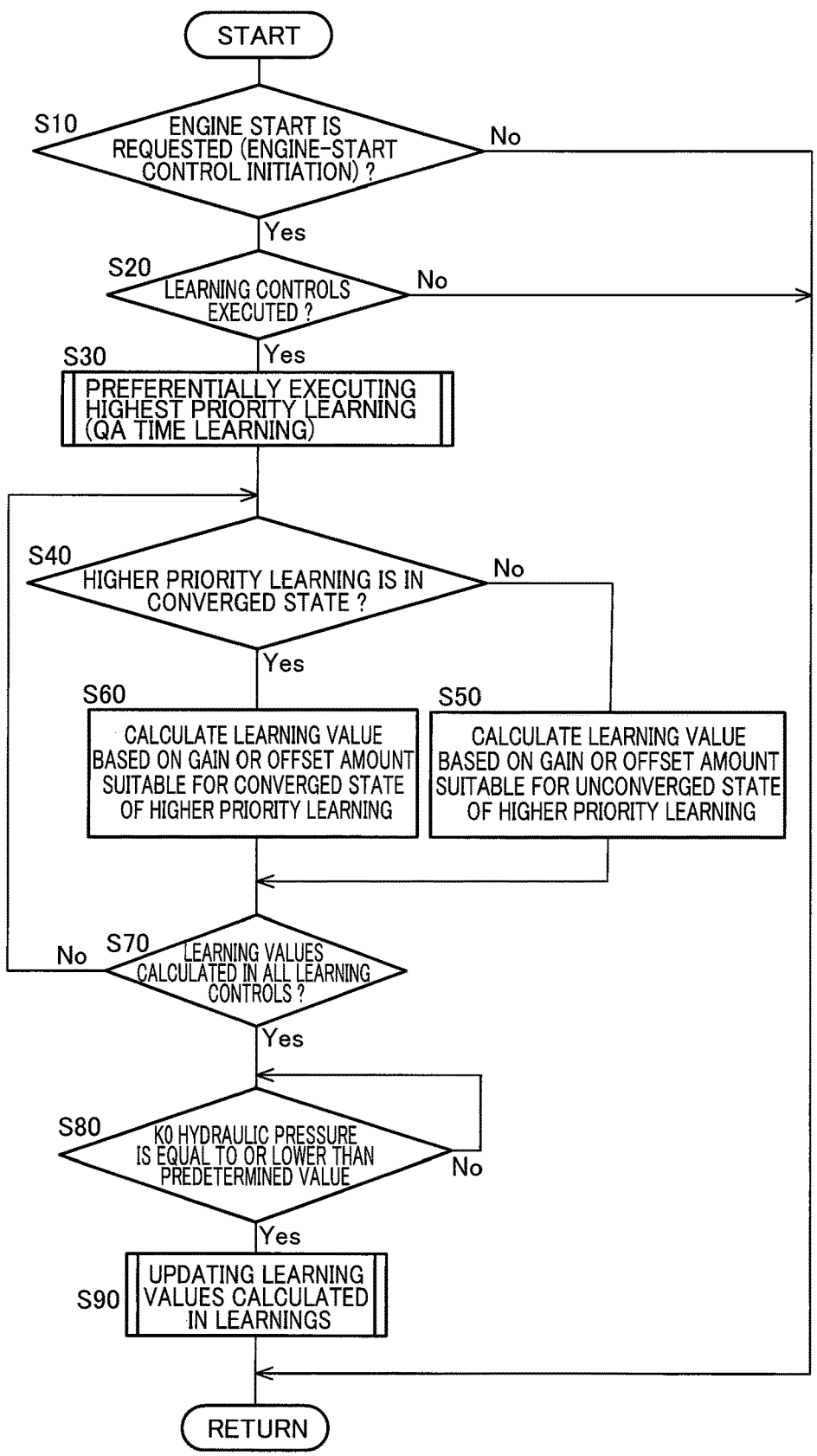
FIG. 7 is a flow chart showing a main part of a control routine executed by an electronic control apparatus, namely, a control routine that is executed, when leanings of command values of the K0 clutch are executed in the engine-start control operation, to quickly progress the leanings.

FIG. 7 is a flow chart showing a main part of a control routine executed by the electronic control apparatus 90, namely, a control routine that is executed, when the leanings of the command values of the K0 clutch 20 are executed in the engine-start control operation, to make it possible to quickly progress the learnings. This control routine is executed in a repeated manner during operation of the vehicle 10.

As shown in FIG. 7, this control routine is initiated with step S10 corresponding to control function of the engine-start control portion 92c, which is implemented to determine whether the starting of the engine 12 is requested or not, namely, whether the engine-start control operation is to be initiated for starting the engine 12 or not. When a negative determination is made at step S10, one cycle of execution of the control routine is terminated. When an affirmative determination is made at step S10, step S20 corresponding to control function of the learning control portion 98 is implemented to determine whether the K0 learning controls CTlrnk0 are to be executed in the current execution of the engine-start control operation. When a negative determination is made at step S20, one cycle of execution of the control routine is terminated. When an affirmative determination is made at step S20, step S30 corresponding to control function of the learning control portion 98 is implemented to execute the QA time learning CTlrnqa that is one of the K0 learning controls CTlrnk0 having the highest priority.

The QA time learning CTlrnqa, which is executed at step S30, will be described with reference to a flow chart of FIG. 8. A control routine shown in the flow chart of FIG. 8 is executed each time when the QA time learning CTlrnqa is executed.

Figure 8:
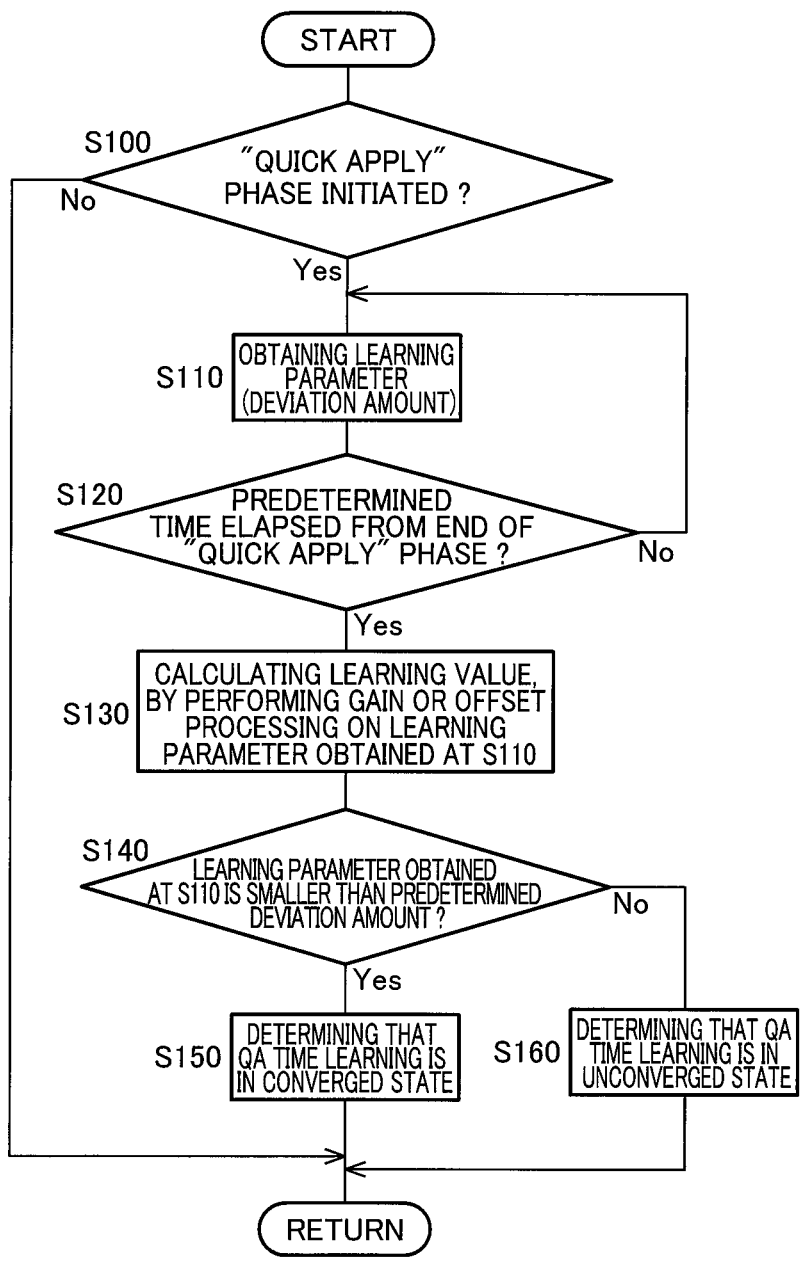
FIG. 8 is a flow chart showing a control routine executed by the electronic control apparatus to learn a QA time.

As shown in FIG. 8, the control routine is initiated with step S100 corresponding to control function of the learning control portion 98, which is implemented to determine whether the "quick apply" phase has been initiated or not, in the starting of the engine 12. When a negative determination is made at step S100, one cycle of execution of the control routine is terminated. When an affirmative determination is made at step S100, step S110 corresponding to control function of the learning control portion 98 is implemented to obtain the learning parameter PALlrn based on the MG-rotational-speed deviation amount $\Delta Nm$ or MG torque deviation amount $\Delta Tm$ of the electric motor MG Then, at step S120 corresponding to control function of the learning control portion 98, it is determined whether the predetermined time has elapsed from the end of the "quick apply" phase, or not. When a negative determination is made at step S120, the control flow goes back to step S110 so as to continue obtaining the learning parameter PALlrn. When an affirmative determination is made at step S120, step S130 corresponding to control function of the learning control portion 98 is implemented to calculate the learning value VALlrn, by performing the gain processing or offset processing on the learning parameter PALlrn obtained at step S110. Then, at step S140 corresponding to control function of the learning control portion 98, it is determined whether the learning parameter PALlrn obtained at S110 is smaller than the predetermined deviation amount K or not. When an affirmative determination is made at step S140, step S150 corresponding to control function of the learning control portion 98 is implemented to determine that the QA time learning CTlrnqa is in the converged state. When a negative determination is made at step S140, step S160 corresponding to control function of the learning control portion 98 is implemented to determine that the QA time learning CTlrnqa is in the unconverged state.

After implementation of step S150 or step S160, the control flow goes back to step S30 of the control routine shown in the flow chart of FIG. 7, and the learning value VALlrn is calculated in the QA time learning CTlrnqa, and then the contact-point learning CTlrnpk that has the second highest priority after the QA time learning CTlrnqa is executed. At step S40 corresponding to control function of the learning control portion 98, it is determined whether the higher priority learning, which is higher than the currently executed learning in terms of the priority order, is in the converged state or not. For example, in a case the QA time learning CTlrnqa has been already executed and the currently executed learning is the contact-point learning CTlrnpk, only the QA time learning CTlrnqa corresponds to the higher priority learning. In this case, at step S40, it is determined whether the QA time learning CTlrnqa as the higher priority learning is in the converged state or not. When a negative determination is made at step S40, step S50 corresponding to control function of the learning control portion 98 to implemented to calculate the learning value VALlrn, based on the gain G or offset amount M that is set to a value suitable for the unconverged state of the higher priority learning. At step S50, for example, the learning value VALlrn of the contact-point learning CTlrnpk is calculated based on the value of the gain Gpkn or offset amount Mpkn, which is set in case of the unconverged state of the QA time learning CTlrnqa. When an affirmative determination is made at step S40, step S60 corresponding to control function of the learning control portion 98 to implemented to calculate the learning value VALlrn, based on the gain G or offset amount M that is set to a value suitable for the converged state of the higher priority learning. At step S60, for example, the learning value VALlrn of the contact-point learning CTlrnpk is calculated based on the value of the gain Gpkn or offset amount Mpkn, which is set in case of the converged state of the QA time learning CTlrnqa.

Step S50 or step S60 is followed by step S70 corresponding to the control function of the learning control portion 98, which is implemented to determine whether the learning values ALlrn in all of the K0 learning controls CTlrnko have been calculated or not. For example, a negative determination is made at step S70 in a case in which the learning values VALlrn have been calculated in the QA time learning CTlrnqa and contact-point learning CTlrnpk but the learning values VALlrn have not yet been calculated in the transmission-torque learning CTlrntk and dead-time learning CTlrntm. As long as the negative determination is made at step S70, the control flow goes back to step S40 so that the learning value VALlrn is calculated in each of at least one of the K0 learning controls CTlrnk0 that have not yet executed. It is noted that, in the K0 learning controls CTlrnk0, the learning values VALlrn are calculated sequentially in accordance with the priority order of the K0 learning controls CTlrnk0. When the learning value VALlrn has been calculated in the contact-point learning CTlrn, the learning value VALlrn is calculated in the transmission-torque learning CTlrntk at steps S40 through S60, and then the learning value VALlrn is calculated in the dead-time learning CTlrntm at steps S40-S60. Then, when the calculation of the learning value VALlrn in the dead-time learning CTlrntm is completed, an affirmative determination is made at step S70.

When the affirmative determination is made at step S70, step S80 corresponding to control function of the learning control portion 98 is implemented to determine whether one of the above-described first and second conditions is satisfied or not, after the engine-start control operation for starting the engine 12 has been completed, wherein the first condition is that the K0 hydraulic pressure PRk0 supplied to the clutch actuator 120 is not higher than the predetermined value $\beta$, and the second condition is that the K0 hydraulic-pressure command value Spk0 is not being outputted to the hydraulic control unit 56. When a negative determination is made at step S80, the update of each learning value VALlrn is awaited until one of the first and second conditions is satisfied, namely, until the K0 hydraulic pressure PRk0 becomes not higher than the predetermined value $\beta$, or until the K0 hydraulic-pressure command value Spk0 is not outputted. When an affirmative determination is made at step S80, step S90 corresponding to control function of the learning control portion 98 is implemented to replace each learning value VALlrn that has been stored in, for example, the ROM of the electronic control apparatus 90, by the new learning value VALlrn that is newly calculated in the latest execution of the corresponding K0 learning control CTlrnk0. That is, at step S90, the learning values VALlrn of the respective K0 learning controls CTlrnk0 are updated to the new learning values VALlrn.

Figure 9:
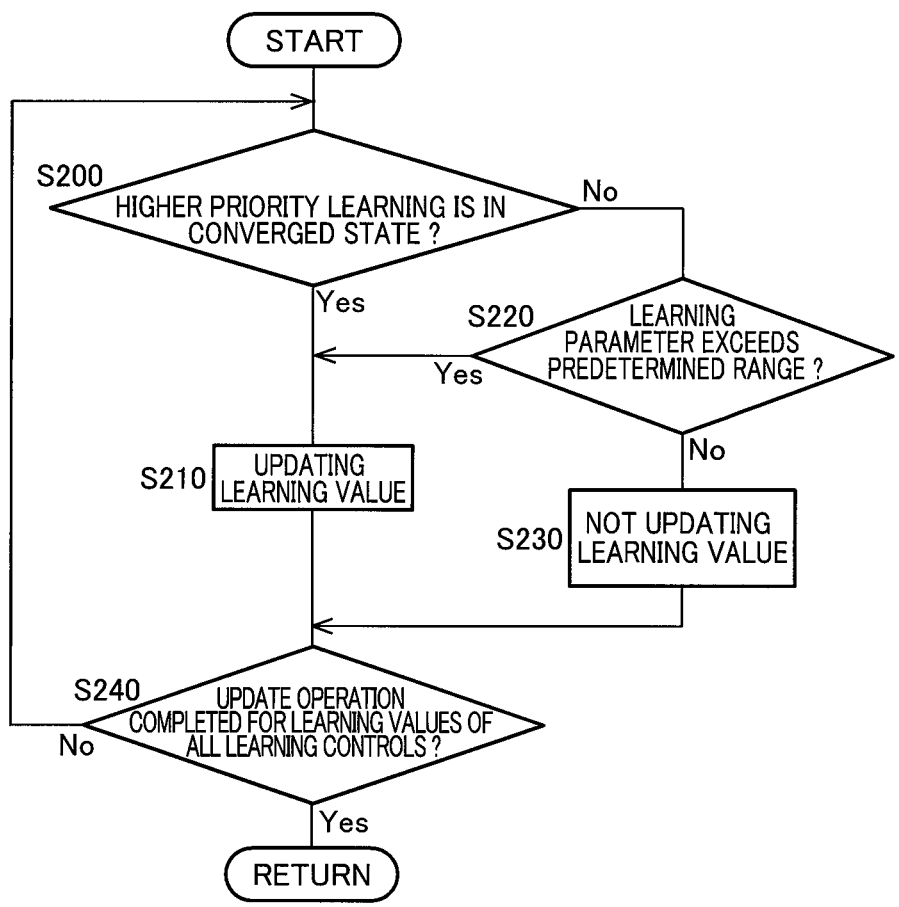
FIG. 9 is a flow chart showing a control routine executed by the electronic control apparatus when the learning values of the respective learnings are to be updated.

The control operations made at step S90 will be described with reference to a flow chart of FIG. 9. A control routine shown in the flow chart of FIG. 9 is executed each time when the learning values VALlrn of the respective K0 learning controls CTlrnk0 are to be updated to the new learning values VALlrn. The updates of the learning values VALlrn also are executed sequentially in accordance with the priority order of the respective K0 learning controls CTlrnk0. That is, this control routine is executed for the K0 learning controls CTlrnk0 sequentially in accordance with the priority order.

As shown in FIG. 9, the control routine is initiated with step S200 corresponding to control function of the learning control portion 98, which is implemented to determine whether the higher priority learning, which is higher than the corresponding K0 learning control CTlrnk0 in terms of the priority order, is in the converged state or not. When an affirmative determination is made at step S200, step S210 corresponding to control function of the learning control portion 98 is implemented to update the learning value VALlrn of the corresponding K0 learning control CTlrnk0. That is, the learning value VALlrn that has been stored in the electronic control apparatus 90 is rewritten or updated to the new learning value VALlrn that is newly calculated in the latest execution of the corresponding K0 learning control CTlrnk0. When a negative determination is made at step S200, step S220 corresponding to control function of the learning control portion 98 is implemented to determination whether the learning parameter PALlrn, i.e., the deviation amount, which has been obtained in the corresponding K0 learning control CTlrnk0, exceeds the predetermined range Rp or not. When an affirmative determination is made at step S220, the control flow goes to step S210 that is implemented to update the learning value VALlrn of the corresponding K0 learning control CTlrnk0. When a negative determination is made at step S220, the control flow goes to step S230 corresponding to control function of the learning control portion 98 at which the learning value VALlrn of the corresponding K0 learning control CTlrnk0 is not updated. Step S210 or step S230 is followed by step S240 corresponding to control function of the learning control portion 98, which is implemented to determine whether the learning values VALlrn of all of the K0 learning controls CTlrnk0 have been subjected to an update operation, which includes a case in which the K0 learning control CTlrnk0 is updated at step S210 and also a case in which it is determined that the K0 learning control CTlrnk0 should not be updated and is not updated at step S220. When a negative determination is made at step S240, the control flow goes back to step S200, whereby the learning value VALlrn of the lower priority learning is subject to the above-described update operation. When an affirmative determination is made at step S240, namely, when the learning values VALlrn of all of the K0 learning controls CTlrnk0 have been subjected to the update operation, one cycle of execution of the control routine is terminated. Thus, with the learning value or values VALlrn being updated, when the K0 clutch 20 is engaged next time, the K0 hydraulic-pressure command value Spk0 is advantageously corrected by adding or subtracting the updated learning value VALlrn to or from the base pressure value of the K0 hydraulic-pressure command value Spk0.

As described above, in the present embodiment, the learning control portion 98 is configured to pre-set the priorities for the plurality of kinds of leanings, and is configured, when it is determined that the higher priority learning, which is higher than the lower priority learning in terms of the priority order, is in the unconverged state, to cause the degree of reflection of the learning result of the lower priority learning to be lower, than when it is determined that the higher priority learning is in the converged state. Thus, even when the higher priority learning is in the unconverged state, the lower priority learning is executed with the degree of reflection of the learning result of the lower priority learning being low, so that it is possible to cause the plurality of kinds of leanings to be quickly progressed while reducing influence of erroneous learning due to the unconverged state of the higher priority learning.

Further, in the present embodiment, in the case in which the learning parameter PALlrn corresponding to the deviation amount and obtained in the lower priority learning exceeds the predetermined range Rp, the lower priority learning is executed without waiting for the convergence of the higher priority learning, so that it is possible to cause the plurality of kinds of leanings to be quickly progressed while reducing influence of erroneous learning due to the unconverged state of the higher priority learning. Further, the QA time learning CTlrnqa is executed in the period from the initiation of output of the fast-filling hydraulic-pressure command value Spk0ff until the predetermined time a elapses from the end of the output of the fast-filling hydraulic-pressure command value Spk0ff. Therefore, the QA time TMqa can be appropriately learned even in the event of the delay of the communication between the electronic control apparatus 90 and the linear solenoid valve configured to control the K0 hydraulic pressure PRk0 supplied to the clutch actuator 120 or the delay of response due to characteristics of the linear solenoid value. Further, each learning value VALlrn is updated to the new learning value VALlrn, which is learned by the corresponding K0 learning control CTlrnk0, after completion of the starting of the engine 12, when the K0 hydraulic pressure PRk0 supplied to the clutch actuator 120 of the K0 clutch 20 is not higher than the predetermined value β or when the hydraulic-pressure command value Spk0 is not being outputted to the hydraulic control unit 56. Thus, when a calculation load applied to the electronic control apparatus 90 is low, each learning value VALlrn is updated so that influence on the other control operations can be suppressed.

While the preferred embodiment of this invention has been described in detail by reference to the drawings, it is to be understood that the invention may be otherwise embodied.

For example, in the above-described embodiment, the K0 learning controls CTlrnk0 executed in the process of the starting of the engine 12 include the QA time learning CTlrnqa, contact-point learning CTlrnpk, transmission-torque learning CTlrntk and dead-time learning CTlrntm that are executed to learn the respective learning objects. However, the contents of the K0 learning controls CTlrnk0 may be changed and the learning objects of the K0 learning controls CTlrnk0 may be changed, as needed. For example, the K0 learning controls CTlrnk0 may include another K0 learning control CTlrnk0 in addition to the above-described K0 learning controls CTlrnk0 or in place of at least one of the above-described K0 learning controls CTlrnk0.

In the above-described embodiment, in the case in which the higher priority learning is in the unconverged state, the update of the learning value VALlrn of the lower priority learning is executed when the value of the learning parameter PALlrn obtained in the lower priority learning exceeds the predetermined range Rp. However, the update of the learning value VALlrn of the lower priority learning may be executed irrespective of whether the value of the learning parameter PALlrn obtained in the lower priority learning exceeds the predetermined range Rp or not. In this modified arrangement, too, it is possible to reduce influence by the update of the learning value VALlrn of the lower priority learning even in the case in which the higher priority learning is in the unconverged state, because the gain G or offset amount M used in the calculation of the learning value VALlrn of the lower priority learning is smaller in the case in which the higher priority learning is in the unconverged state than in the case in which the higher priority learning is in the converged state.

In the above-described embodiment, the QA time learning CTlrnqa is executed to learn the correction value of the QA time, based on the learning parameter PALlrn that is obtained in the period from the initiation of the "quick apply" phase until the predetermined time a elapses from the end of the "quick apply" phase. In each of the other K0 learning controls CTlrnk0, too, to the extent that there is no contradiction, it may be executed for correcting the relationship representing the correlation between the K0 hydraulic pressure PRk0 and the K0 hydraulic-pressure command value Spk0, based on the deviation amount in the form of the learning parameter PALlrn that is obtained in a period from initiation of a corresponding one of the progress phases until a predetermined time elapses from end of the corresponding one of the progress phases.

In the above-described embodiment, the learning parameter PAlrn is the MG-rotational-speed deviation amount ΔNm or the MG torque deviation amount ΔTm. However, the learning parameter PAlrn does not have to be necessarily the MG-rotational-speed deviation amount ΔNm or the MG torque deviation amount ΔTm, but may be any other value as long as the value represents a phenomenon caused by unconvergence of a corresponding one of the learning value VALlrn calculated in a corresponding one of the K0 learning controls CTlrnk0, or represents a phenomenon caused by deviation of the K0 hydraulic pressure PRk0 from the K0 hydraulic-pressure command value Spk0.

In the above-described embodiment, as a method of starting the engine 12, there has been described a method of starting the engine 12 in which the engine 12 is ignited in time with cranking of the engine 12 in a transition of the K0 clutch 20 from the released state to the engaged state, so as to cause the engine rotational speed Ne to be increased by the engine 12 itself. However, the present invention is applicable also to any other method of starting the engine 12, such as a method in which the engine 12 is ignited after the engine 12 is cranked until the K0 clutch 20 is placed in the fully engaged state or in a state close to the fully engaged state.

In the above-described embodiment, the learning control portion 98 determines whether the learning value VALlrn of each K0 learning control CTlrnk0 has been converged or not, depending on whether the value of the learning parameter PAlrn obtained in the K0 learning control CTlrnk0 is smaller than the predetermined deviation amount K that is determined for the determination as to whether the learning value VALlrn has been converged or not. However, the determination as to whether the learning value VALlrn has been converged or not may be made depending on whether the learning value VALlrn is smaller than a predetermined amount that is determined for the determination as to whether the learning value VALlrn has been converged or not.

In the above-described embodiment, when the learning value VALlrn is updated to the new learning value VALlrn that is newly obtained in the latest execution of the corresponding K0 learning control CTlrnk0, the K0 hydraulic-pressure command value Spk0 is corrected by adding or subtracting the new learning value VALlrn to or from the base pressure value of the K0 hydraulic-pressure command value Spk0, in the next engagement of the K0 clutch 20. However, the base pressure value of the K0 hydraulic-pressure command value Spk0 itself may be corrected (updated) based on the learning value VALlrn.

In the above-described embodiment, the gain G or offset amount M used in the calculation of the learning value VALlrn in the QA time learning CTlrnqa having the highest priority is not changed depending on whether the QA time learning CTlrnqa is in the converged state or unconverged state. However, it may be changed depending on whether the QA time learning CTlrnqa itself is in the converged state or unconverged state. Specifically, in this modified arrangement, the gain G or offset amount M used in the calculation of the learning value VALlrn in the QA time learning CTlrnqa is made smaller when the QA time learning CTlrnqa is in the unconverged state, than when the QA time learning CTlrnqa is in the converged state.

In the above-described embodiment, the automatic transmission 24 is an automatic transmission of a planetary gear type. However, the automatic transmission 24 may be any one of other type transmissions such as a known belt-type continuously variable transmission and a synchronous mesh twin shaft parallel axis-type automatic transmission including a known DCT (Dual Clutch Transmission).

In the above-described embodiment, the fluid-type transmission device in the form of the torque converter 22 is provided in the power transmission apparatus 16. However, the provision of the torque converter 22 is not essential. For example, the fluid-type transmission device may be constituted by, in place of the torque converter 22, by another fluid-type transmission device such as a fluid coupling device without a function of torque boost effect. Moreover, the fluid-type transmission device does not necessarily have to be provided but may be replaced by a starting clutch, for example.

It is to be understood that the embodiment described above is given for illustrative purpose only, and that the present invention may be embodied with various modifications and improvements which may occur to those skilled in the art.

NOMENCLATURE OF ELEMENTS

10: vehicle
12: engine
14: drive wheels
20: K0 clutch (clutch)
56: hydraulic control unit
90: electronic control apparatus (control apparatus)
92c: engine-start control portion
94: clutch control portion
98: learning control portion
120: clutch actuator
MG: electric motor
CTlrnk0: K0 learning control (learning)
CTlrnqa: QA time learning (fast-filling-time learning, higher priority learning, learning)
CTlrnpk: contact-point learning (learning)
CTlrntk: transmission-torque learning (learning)
CTlrntm: dead-time learning (learning)
PRk0: K0hydraulic pressure (hydraulic pressure)
Rp: predetermined range
Spk0: hydraulic-pressure command value
Spk0ff: fast-filling hydraulic-pressure command value
Spk0cr: cranking hydraulic-pressure command value
Tcrn: required cranking torque
TMqa: QA time (fast filling time)
VALlrn: learning value
α: predetermined time
ΔNm: MG-rotational-speed deviation amount (deviation amount)
ΔnTm: MG torque deviation amount (deviation amount)

What is claimed is:

1. A control apparatus for a vehicle that includes: an engine; drive wheels; an electric motor connected to a power transmission path between the engine and the drive wheels, in a power transmittable manner; a clutch which is disposed in the power transmission path between the engine and the electric motor and which includes a hydraulic clutch actuator that is to be controlled to switch an operation state of the clutch; and a hydraulic control unit configured to supply a regulated hydraulic pressure to the clutch actuator, the control apparatus comprising:
an engine-start control portion configured, when the engine is to be started, to control the electric motor such that an output torque of the electric motor is increased by a magnitude corresponding to a required cranking torque that is a torque required for cranking of the engine, and to control the engine to start the engine;
a clutch control portion configured, when the engine is to be started, to output, as a hydraulic-pressure command value for supplying the hydraulic pressure to the clutch actuator, a cranking hydraulic-pressure command value for regulating the hydraulic pressure supplied to the clutch actuator so as to cause the required cranking torque to be transmitted through the clutch, such that the outputted cranking hydraulic-pressure command value is supplied to the hydraulic control unit in an engaging process for switching of the operation state of the clutch from a released state to an engaged state; and a learning control portion configured to execute a plurality of kinds of leanings for correcting a relationship representing a correlation between the hydraulic pressure and the hydraulic-pressure command value in the engaging process, wherein the learning control portion is configured to set priorities for the plurality of kinds of learnings, such that at least one of the plurality of kinds of learnings is a higher priority learning to which a higher priority is given, and such that at least one of the plurality of kinds of learnings is a lower priority learning to which a lower priority is given than to the higher priority learning, and wherein the learning control portion is configured, when it is determined that the higher priority learning is in an unconverged state, to cause a degree of reflection of a learning result of the lower priority learning to be lower, than when it is determined that the higher priority learning is in a converged state.

2. The control apparatus according to claim 1,
wherein the learning control portion is configured to cause the learning result of the lower priority learning to be reflected on the relationship representing the correlation between the hydraulic pressure and the hydraulic-pressure command value, in a case in which a deviation amount variable depending a condition of the clutch and obtained in the lower priority learning exceeds a predetermined range when it is determined that the higher priority learning is in the unconverged state.

3. The control apparatus according to claim 1,
wherein the engaging process of the clutch is sectioned into a plurality of progress phases according to the operation state of the clutch that is changed in the engaging process of the clutch, wherein each of the plurality of kinds of leanings is to be executed in a corresponding one of the progress phases in the engaging process of the clutch, and wherein the plurality of kinds of learnings include a learning that is to be executed for correcting the relationship representing the correlation between the hydraulic pressure and the hydraulic-pressure command value, based on the deviation amount which is variable depending on the condition of the clutch and which is obtained in a period from initiation of a corresponding one of the progress phases until a predetermined time elapses from end of the corresponding one of the progress phases.

4. The control apparatus according to claim 3,
wherein the clutch includes a first member that is to be rotated with rotation of the engine and a second member that is to be rotated with rotation of the electric motor, wherein the clutch actuator is configured to eliminate a clearance between the first and second members of the clutch, owing to the hydraulic pressure supplied to the clutch actuator, wherein the plurality of kinds of leanings include a fast-filling-time learning for learning a fast filling time in which a fast-filling hydraulic-pressure command value is outputted for improving a responsiveness of the hydraulic pressure in the clutch actuator so as to quickly eliminate the clearance between the first and second members of the clutch, and wherein the fast-filling-time learning is to be executed for learning the fast filling time, based on the deviation amount which is obtained in a period from initiation of output of the fast-filling hydraulic-pressure command value until a predetermined time elapses from end of the output of the fast-filling hydraulic-pressure command value.

5. The control apparatus according to claim 1,
wherein the learning control portion is configured to update the relationship representing the correlation between the hydraulic pressure and the hydraulic-pressure command value, based on the leaning result of each of the plurality of kinds of learnings, after completion of starting of the engine, when the hydraulic pressure supplied to the clutch actuator is not higher than a predetermined value or when the hydraulic-pressure command value is not being supplied to the hydraulic control unit.

6. The control apparatus according to claim 1,
wherein the learning control portion is configured to execute each of the plurality of kinds of learnings so as to correct the hydraulic-pressure command value, based on the learning result obtained in the each of the plurality of kinds of learnings, and wherein the hydraulic-pressure command value is corrected through the lower priority learning by an amount that is smaller when it is determined that the higher priority learning is in the unconverged state, than when it is determined that the higher priority learning is in the converged state.

* * * * *